US008265887B2

(12) United States Patent
Itou et al.

(10) Patent No.: US 8,265,887 B2
(45) Date of Patent: Sep. 11, 2012

(54) FLOW MEASUREMENT APPARATUS AND PROGRAM THEREOF, FLOW MEASUREMENT METHOD AND FLUID SUPPLY SYSTEM

(75) Inventors: Youichi Itou, Nara (JP); Hajime Miyata, Nara (JP); Yasuhiro Umekage, Shiga (JP); Kenichi Kamon, Nara (JP)

(73) Assignee: Panasonic Corporation, Osaka (JP)

( * ) Notice: Subject to any disclaimer, the term of this patent is extended or adjusted under 35 U.S.C. 154(b) by 515 days.

(21) Appl. No.: 12/523,629

(22) PCT Filed: Jan. 16, 2008

(86) PCT No.: PCT/JP2008/050453
§ 371 (c)(1),
(2), (4) Date: Jul. 17, 2009

(87) PCT Pub. No.: WO2008/087989
PCT Pub. Date: Jul. 24, 2008

(65) Prior Publication Data
US 2010/0017150 A1 Jan. 21, 2010

(30) Foreign Application Priority Data

Jan. 17, 2007 (JP) .................................. 2007-007760
Feb. 16, 2007 (JP) .................................. 2007-036749
Mar. 9, 2007 (JP) .................................. 2007-059869

(51) Int. Cl.
*G01F 1/00* (2006.01)
*G01F 1/20* (2006.01)
*G01F 25/00* (2006.01)
*G01F 5/00* (2006.01)
*G01F 3/00* (2006.01)

(52) U.S. Cl. ............ 702/45; 702/100; 702/182; 73/861; 73/196

(58) Field of Classification Search .................... 702/33, 702/45, 46, 50, 55, 100, 182, 183; 73/1.02, 73/19.04, 19.1, 23.24, 53.01, 53.04, 861, 73/195, 196, 521
See application file for complete search history.

(56) References Cited

U.S. PATENT DOCUMENTS
7,221,991 B2 * 5/2007 Matsushita et al. ........... 700/110
(Continued)

FOREIGN PATENT DOCUMENTS
JP 2002-174542 6/2002
(Continued)

OTHER PUBLICATIONS
JP Office Action mailed Jun. 16, 2009, 6 pages.
(Continued)

*Primary Examiner* — Mohamed Charioui
*Assistant Examiner* — Ricky Ngon
(74) *Attorney, Agent, or Firm* — Brinks Hofer Gilson & Lione

(57) ABSTRACT

A fluid measurement apparatus capable of accurately determining an activated appliance is provided. A flow measurement apparatus 100 has a flow measurement unit 12 that measures an amount of fluid flowing through a passageway, a determination zone storage unit 16 that allocates and stores a flow measured by the flow measurement unit 12 into determination zones classified by combination of a plurality of conditions; a grouping unit 18 that groups determination zones according to appliances to be used on the basis of determination-zone-specific storage values stored in the determination zone storage unit 16 and that registers the grouped determination zones; and an integration unit 20 that integrates a flow value for each of the determination zones registered by the grouping unit 18. Thus, a flow is integrated for each determination zone grouped according to an appliance. An appliance is determined by reference to a database including the integrated data.

41 Claims, 16 Drawing Sheets

U.S. PATENT DOCUMENTS

| | | | |
|---|---|---|---|
| 7,788,969 B2 * | 9/2010 | Verdegan | 73/61.69 |
| 2007/0202477 A1 | 8/2007 | Nakagawa | |
| 2008/0270045 A1 | 10/2008 | Miyata et al. | |
| 2009/0043716 A1 * | 2/2009 | Hori et al. | 706/12 |

FOREIGN PATENT DOCUMENTS

| | | |
|---|---|---|
| JP | 2003-149075 | 5/2003 |
| JP | 2003-194331 | 7/2003 |
| JP | 2005-083771 | 3/2005 |
| JP | 2006-023165 | 1/2006 |
| JP | 2006-095266 A | 4/2006 |
| JP | 2006-200797 A | 8/2006 |
| JP | 2006-297603 A | 11/2006 |
| JP | 2007-024750 | 2/2007 |
| JP | 2007-024753 | 2/2007 |
| JP | 2007-024807 | 2/2007 |

OTHER PUBLICATIONS

International Search Report mailed Mar. 11, 2008 in PCT/JP2008/050453, 1 page.

* cited by examiner

FIG. 2

| CHARACTERISTIC OF START WAVEFORM | START FLOW | DURATION | | | |
|---|---|---|---|---|---|
| | | 0 TO 3 MIN. | 3 MIN. TO 10 MIN. | 10 MIN. TO 30 MIN. | 30 MIN. OR MORE |
| GENTLE | 400 L/h OR MORE | 67 | | | |
| | 200 L/h TO 400 L/h | | | | |
| | 160 L/h TO 200 L/h | | | | |
| | 140 L/h TO 160 L/h | | 54 | | |
| | 120 L/h TO 140 L/h | | 5 | 5 | |
| | 100 L/h TO 120 L/h | | 2 | 13 | 2 |
| | 80 L/h TO 100 L/h | | 51 | 36 | |
| | 60 L/h TO 80 L/h | | | | |
| | 0 L/h TO 60 L/h | | | | |
| VARIATION (OVERSHOOT) | 400 L/h OR MORE | 524 | 177 | 31 | |
| | 200 L/h TO 400 L/h | 49 | 45 | | 9 |
| | 160 L/h TO 200 L/h | | | 31 | 22 |
| | 140 L/h TO 160 L/h | 15 | | | |
| | 120 L/h TO 140 L/h | 105 | | | |
| | 100 L/h TO 120 L/h | 20 | | | |
| | 80 L/h TO 100 L/h | | 6 | 45 | |
| | 60 L/h TO 80 L/h | 20 | | | |
| | 0 L/h TO 60 L/h | | | | |
| STEEP | 400 L/h OR MORE | | | | |
| | 200 L/h TO 400 L/h | 131 | 5 | 6 | 66 |
| | 160 L/h TO 200 L/h | 1153 | 43 | 7 | |
| | 140 L/h TO 160 L/h | 8 | 47 | 40 | 21 |
| | 120 L/h TO 140 L/h | | | | |
| | 100 L/h TO 120 L/h | | | | |
| | 80 L/h TO 100 L/h | | | | |
| | 60 L/h TO 80 L/h | 4 | 46 | 15 | |
| | 0 L/h TO 60 L/h | | | | |

FIG. 7

| METER INFORMATION | | |
|---|---|---|
| CHARACTERISTIC OF START WAVEFORM | START FLOW | 0 TO 3 MIN. |
| GENTLE | 400 L/h OR MORE | |
| | 200 L/h TO 400 L/h | |
| | 160 L/h TO 200 L/h | |
| | 140 L/h TO 160 L/h | |
| | 120 L/h TO 140 L/h | |
| | 100 L/h TO 120 L/h | |
| | 80 L/h TO 100 L/h | |
| | 60 L/h TO 80 L/h | |
| | 0 L/h TO 60 L/h | 67 |
| VARIATION (OVERSHOOT) | 400 L/h OR MORE | |
| | 200 L/h TO 400 L/h | 524 |
| | 160 L/h TO 200 L/h | 49 |
| | 140 L/h TO 160 L/h | 15 |
| | 120 L/h TO 140 L/h | 105 |
| | 100 L/h TO 120 L/h | 20 |
| | 80 L/h TO 100 L/h | |
| | 60 L/h TO 80 L/h | 20 |
| | 0 L/h TO 60 L/h | |
| STEEP | 400 L/h OR MORE | |
| | 200 L/h TO 400 L/h | |
| | 160 L/h TO 200 L/h | |
| | 140 L/h TO 160 L/h | 131 |
| | 120 L/h TO 140 L/h | 1153 |
| | 100 L/h TO 120 L/h | 8 |
| | 80 L/h TO 100 L/h | |
| | 60 L/h TO 80 L/h | |
| | 0 L/h TO 60 L/h | 4 |

HOT WATER SUPPLY
FH
GT

⇕ CHECKING

340: DATABASE

APPLIANCE WITH WAVEFORM INCLUDING VARYING LEADING EDGE
COMPANY A: W001, W002...
COMPANY B: FH001, FH002...

APPLIANCE WITH WAVEFORM INCLUDING STEEP LEADING EDGE
COMPANY A: GT001, GT002...
COMPANY B: FF201, FF301...

DATA PERTAINING GT001 MANUFACTURED BY COMPANY A
FLOW 130 L/h, VARIATION OF ±30 L/h,
STANDARD OPERATION TIME 0.03h,
VARIATION OF ±0.05h

DATA PERTAINING FH002 MANUFACTURED BY COMPANY B
FLOW 140 L/h, VARIATION OF ±10 L/h,
STANDARD OPERATION TIME 2.0h,
VARIATION OF ±1.0h

PRODUCT NUMBER

GAS APPLIANCE MANAGER (GAS COMPANY) — 300
⇩ UPDATE

FIG. 10 (a)

| TIME | REFERENCE DATA FLOW | OBJECT DATA FLOW | CORRELATION COEFFICIENT |
|---|---|---|---|
| t(0) | Q(0) | q(0) | - |
| t(1) | Q(1) | q(1) | R(1) |
| t(2) | Q(2) | q(2) | R(2) |
| t(3) | Q(3) | q(3) | R(3) |
| t(4) | Q(4) | q(4) | R(4) |
| t(5) | Q(5) | q(5) | R(5) |

FIG. 10 (b)

| TIME | REFERENCE DATA FLOW | OBJECT DATA FLOW | CORRELATION COEFFICIENT |
|---|---|---|---|
| t(0) | Q(0) | q(0) | - |
| t(1) | Q(1) | q(1) | R(1) |
| t(2) | Q(2) | q(2) | R(2) |
| t(3) | Q(3) | q(3) | R(3) |
| t(4) | Q(4) | q(4) | R(4) |
| t(5) | Q(5) | q(5) | R(5) |

FIG. 10 (c)

| TIME | REFERENCE DATA FLOW | OBJECT DATA FLOW | CORRELATION COEFFICIENT |
|---|---|---|---|
| t(0) | Q(0) | q(0) | - |
| t(1) | Q(1) | q(1) | R(1) |
| t(2) | Q(2) | q(2) | R(2) |
| t(3) | Q(3) | q(3) | R(3) |
| t(4) | Q(4) | q(4) | R(4) |
| t(5) | Q(5) | q(5) | R(5) |

FIG. 10 (d)

| TIME | REFERENCE DATA FLOW | OBJECT DATA FLOW | CORRELATION COEFFICIENT |
|---|---|---|---|
| t(0) | Q(0) | q(0) | - |
| t(1) | Q(1) | q(1) | R(1) |
| t(2) | Q(2) | q(2) | R(2) |
| t(3) | Q(3) | q(3) | R(3) |
| t(4) | Q(4) | q(4) | R(4) |
| t(5) | Q(5) | q(5) | R(5) |

FIG. 10 (e)

| TIME | REFERENCE DATA FLOW | OBJECT DATA FLOW | CORRELATION COEFFICIENT |
|---|---|---|---|
| t(0) | Q(0) | q(0) | - |
| t(1) | Q(1) | q(1) | R(1) |
| t(2) | Q(2) | q(2) | R(2) |
| t(3) | Q(3) | q(3) | R(3) |
| t(4) | Q(4) | q(4) | R(4) |
| t(5) | Q(5) | q(5) | R(5) |

FIG. 13

| CHARACTERISTIC OF LEADING EDGE | FLOW CHANGE PATTERN | GROUP | CORRELATION COEFFICIENT |
|---|---|---|---|
| GENTLE | REFERENCE PATTERN 1 (REFERENCE DATA 1), FLOW vs TIME | (A) | COEFFICIENT EQUAL TO P OR MORE WITH RESPECT TO REFERENCE DATA 1 |
| STEEP | REFERENCE PATTERN 2 (REFERENCE DATA 2), FLOW vs TIME | (B) | COEFFICIENT EQUAL TO P OR MORE WITH RESPECT TO REFERENCE DATA 2 |
| CHARACTERISTIC OTHER THAN THOSE MENTIONED ABOVE | PATTERN OTHER THAN THOSE PROVIDED ABOVE | (C) | |

FIG. 14

| CHARACTERISTIC OF LEADING EDGE | FLOW CHANGE PATTERN | CORRELATION COEFFICIENT | FLOW | GROUP |
|---|---|---|---|---|
| GENTLE | REFERENCE 1 (REFERENCE PATTERN 1 / REFERENCE DATA 2) | COEFFICIENT EQUAL TO P OR MORE WITH RESPECT TO REFERENCE DATA 1 (A) | Q1~Q2 | (D) |
| | | | Q2~Q3 | (E) |
| | | | Q3~Q4 | (F) |
| STEEP | REFERENCE 2 (REFERENCE PATTERN 2 / REFERENCE DATA 2) | COEFFICIENT EQUAL TO P OR MORE WITH RESPECT TO REFERENCE DATA 2 (B) | Q1~Q2 | (G) |
| | | | Q2~Q3 | (H) |
| | | | Q3~Q4 | (I) |
| CHARACTERISTIC OTHER THAN THOSE MENTIONED ABOVE | PATTERN OTHER THAN THOSE PROVIDED ABOVE | (C) | | |

FLOW MEASUREMENT APPARATUS AND PROGRAM THEREOF, FLOW MEASUREMENT METHOD AND FLUID SUPPLY SYSTEM

TECHNICAL FIELD

The present invention relates to a technique for comparing previously-registered flow information with measured flow information, to thus classify measured flow information on a per-group basis.

BACKGROUND ART

As shown in FIG. 18, a flow measurement apparatus of this type hitherto has been provided with gas flow measurement means 401 that measures a gas flow in a gas passageway; flow increase detection means 402 that detects a flow increase on the basis of a measurement result; flow increase/decrease detection means 403 that detects an instantaneous increase/decrease change in gas flow incidental to the flow increase; appliance determination means 404 that determines initiation of use of a new gas combustion appliance when the instantaneous increasing/decreasing change is detected; and flow registration means 405 that registers an increase in gas flow detected by the flow increase detection means as a gas flow increase incidental to initiation of use of the new gas combustion appliance (see; for instance, Patent Document 1).

An attention is paid to the fact that an instantaneous increasing or decreasing change arises in gas flow at the time of initiation of use of a new gas combustion appliance and is followed by a stable gas flow, and initiation of use of a new gas combustion appliance is determined by means of the foregoing configuration at the time of determination of an increasing/decreasing change. Thereby, initiation of use of a new gas combustion appliance is determined by a simple method, and a gas increase resultant from use of the new gas combustion appliance can be registered.

However, the related-art configuration encounters a problem of difficulty in determining whether a flow increase results from use of the same appliance or a new gas combustion appliance.

To solve the problem, a flow measurement apparatus shown in FIG. 19 has an ultrasonic flow meter 407 serving as a flow measurement unit for measuring a flow in a passageway 406; a measured flow storage unit 408 that stores a flow value of the ultrasonic flow meter 407 and time information; learning appliance registration means 421 that registers, as appliance flow information, information about a flow measured for a given period of time; an appliance flow information storage unit 422 that registers and stores the measured flow information; and appliance determination means 411 that compares the measured flow information in the measured flow storage unit 408 with appliance flow information in the appliance flow information storage unit 422, thereby determining an appliance. Reference numeral 412 designates number-of-appliances determination means; 413 to 415 designate gas appliances; 416 designates a gas meter serving as a flow measurement apparatus; 417 designates a passageway cutoff valve; 418 designates an operation unit; 419 designates a gas passageway; and 420 designates appliance-specific flow computation means (see Patent Document 2).

The flow measurement apparatus enables storage and registration of measured flow information and determination of usage conditions of a plurality of appliances. So long as the type of an appliance (a hot water supply, a gas cooker, and the like) is previously registered, the appliance being used can also be specified.

There has also been proposed a gas meter that extracts from a flow pattern table a gas flow pattern detected from a gas supply line and a matched part flow pattern and that extracts from an appliance table a gas appliance matching a combination of the extracted partial flow patterns, thereby determining a gas appliance being used (see Patent Document 3).

Patent Document 1: JP-A-2002-174542
Patent Document 2: JP-A-2007-024750
Patent Document 3: JP-A-2003-149075

DISCLOSURE OF THE INVENTION

Problem That the Invention is to Solve

However, in connection with the configuration, specific processing for determining an appliance from measured flow information in order to register an appliance is not explicitly disclosed.

When a gas appliance is determined from flow information, a determination is commonly made by utilization of a flow characteristic unique to an appliance. There is a case where the characteristic flow property varies from one appliance to another. There is a potential risk of an erroneous determination being made when a gas appliance is determined by use of one flow property. Moreover, it is considered that a flow of a gas appliance changes for reasons of aged deterioration, or other reasons. When a determination is continually performed without taking into account the change, an erroneous determination may arise.

Various appliances are in circulation, and there is continued growth of new products. It is difficult to keep all registration data pertaining to appliances. When an attempt is made to determine a result of flow measurement at each household, there is a limit to the volume of data to be used. When there is a necessity for making a determination with higher precision, there is a limit to precision.

The present invention has been conceived to solve the problem and aimed at providing a flow measurement apparatus capable of accurately determining an activated gas appliance at all times.

The present invention aims at providing a flow measurement apparatus capable of determining a flow with higher precision at all times.

Means for Solving the Problem

A flow measurement apparatus of the present invention has a flow measurement unit that measures an amount of fluid flowing through a passageway; a determination zone storage unit that allocates a value to any of classified determination zones in accordance with flow information measured by the flow measurement unit and that stores the allocated value; and a grouping unit that groups the determination zones, on the basis of the values for the respective determination zones stored in the determination zone storage unit, according to an appliance being used, and that registers the grouped determination zones.

Moreover, a correction is desirably made to an output from the flow measurement apparatus in a database of a business establishment by use of a communication line or a data collection terminal (a handy terminal), thereby determining an appliance.

According to the above configuration, determination zones, which are classified in a detailed manner, are created by combination of a plurality of characteristic flow properties of gas appliances, and the like. The determination zones are grouped on the basis of stored data in which operation histories of predetermined periods are accumulated while being allocated to the respective determination zones. Therefore, it becomes possible to accurately determine an appliance in accordance with a plurality of characteristic flow properties and flow operation record data. Further, more accurate determination of a gas appliance can be fulfilled without being affected by an individual difference among different gas appliances, aged deterioration of a gas appliance, and the like, by registration of the determination zones based on the operation histories of predetermined periods.

Moreover, a correction is made by means of a database in a business establishment and through use of a communication line or a data collection terminal, and determination of an appliance is performed, whereby more appropriate, highly-reliable determination of an appliance becomes possible.

In addition, a flow measurement apparatus of the present invention includes a flow measurement unit that measures an amount of fluid flowing through a passageway; a determination zone setting unit that classifies flow information measured by the flow measurement unit under a first condition and set the classified information as a determination zone; a determination zone storage unit that stores each of pieces of zone information; a determination zone decision unit that sorts, on the basis of a determination zone stored in the determination zone storage unit, a flow value measured by the flow measurement unit or the number of occurrences of a flow value for each determination zone; a grouping unit that groups the data stored for each determination zone in the determination zone storage unit under a second condition, thereby registering the determination zone; and an integration unit that integrates the flow value or the number of occurrences of a flow value.

The present invention also provides the flow measurement apparatus in which the integration unit integrates, for each determination zone, the flow value or the number of occurrences of a flow value.

The present invention further provides the flow measurement apparatus in which the grouping unit groups the flow value or the number of occurrences of a flow value integrated by the integration unit.

The present invention also provides the flow measurement apparatus in which the conditions are a combination of a plurality of conditions.

According to the above configuration, determination zones, which are classified in a detailed manner, are created by one characteristic flow property of a gas appliance or a combination of a plurality of characteristic flow properties of gas appliances. There are registered determination zones that are grouped on the basis of stored data in which operation histories of predetermined periods are accumulated while being allocated to the respective determination zones. Moreover, a flow value is integrated according to the registered determination zones. Therefore, it becomes possible to accurately determine an appliance in accordance with a plurality of characteristic flow properties. Further, more accurate determination of a gas appliance can be fulfilled without being affected by an individual difference among different gas appliances, aged deterioration of a gas appliance, and the like, by registration of the determination zones based on the operation histories of predetermined periods. In such a case where there are only a gas cooker and a fan heater, it is not necessary to classify determination zones by combination of a plurality of property conditions, and a determination can be made by means of only waveform information.

The present invention also provides the flow measurement apparatus in which the determination zone storage unit stores zone information classified under the first condition by the determination zone setting unit in a previously-set predetermined learning period.

The determination zone serving as a determination criterion is registered on the basis of operation record data achieved within a predetermined period during which an appliance to be determined is used. Hence, it becomes possible to accurately determine an appliance without being affected by an individual difference among different gas appliances, aged deterioration of a gas appliance, and the like. Processing for accumulating operation record data used for updating or re-registering a determination zone can be readily performed by performing initialization after registration of the determination zone.

The present invention provides the flow measurement apparatus in which the grouping unit registers a determination zone on the basis of predetermined determination conditions originating from a determination-zone-specific value stored in the determination zone storage unit within the learning period and registers a corresponding appliance for each registered determination zone.

Grouping is performed in accordance with the number of occurrences of a flow during a predetermined period stored for each determination zone, by use of the second condition; for instance, a selection condition for selecting top "n" determination zones where the number of occurrences is high or a selection condition for selecting a determination zone where there are a predetermined number of occurrences. The thus-grouped determination zones are registered, and corresponding appliances are registered according to the registered determination zones. Hence, determination criteria conforming to appliances to be used and actual operating statuses can be set, so that it is possible to determine a gas appliance more accurately.

Moreover, the present invention provides the flow measurement apparatus in which the integration unit integrates, after a learning period, a flow value measured by the flow measurement unit for each registered determination zone, and the appliance determination unit separately performs processing as use of an appliance other than a registered appliance or occurrence of a leakage when the integration unit performs integration of a flow in connection with a determination zone other than the registered determination zone.

A value of a used flow is integrated for each of the registration determination zones set in compliance with actual appliances to be used and actual operation statuses; hence, an integrated value can be accurately measured on a per-appliance basis. Further, newly addition of an appliance being used or occurrence of a leakage can be readily ascertained. When an appliance being used is added, registration processing is again performed. When there is a fear of occurrence of a leakage, leakage detection processing is performed. Thus, every possible event, which would be conceivable in a usage pattern of a gas appliance, can be readily addressed.

The present invention also provides an appliance determination system comprising an appliance determination unit, in the flow measurement apparatus, that inputs an output from the grouping unit or the integration unit into a database where reference data are stored, thereby determining an appliance which uses a fluid.

Grouping is performed in accordance with the number of occurrences of a flow during a predetermined period stored for each determination zone, by use of the second condition; for instance, a selection condition for selecting top "n" determination zones where the number of occurrences is high or a selection condition for selecting a determination zone where there are a predetermined number of occurrences. The thus-grouped determination zones are registered, and corresponding appliances are registered according to the registered determination zones. Hence, determination criteria conforming to appliances to be used and actual operating statuses can be set, so that it is possible to determine a gas appliance more accurately.

The present invention also provides the appliance determination system in which the database is a rewritable database that is attached to the flow measurement apparatus.

Since the configuration enables appropriate rewriting of a database as needed, data compatible with a plurality of types can be used, and appropriate determination of an appliance becomes possible.

The present invention also provides the appliance determination system in which the database is connected to the flow measurement apparatus by way of a communication line.

Since the configuration enables establishment of a connection to a database having a plurality of sets of data by way of a communication line, data compliant with a plurality of types can be used, and appropriate determination of an appliance becomes possible.

The present invention provides the appliance determination system in which the database is connectable to a data collection terminal connected to the flow measurement apparatus.

Since the configuration enables establishment of a connection to an appropriate database by way of a data collection terminal, a meter inspector can use more appropriate data, so that appropriate determination of an appliance becomes possible.

The present invention also provides the appliance determination system in which the database stores, as reference data, previously-measured waveform data pertaining to an individual appliance; and in which the appliance determination unit compares the reference data with an output from the integration unit or the grouping unit, thereby determining which appliance is using a fluid.

The configuration enables more appropriate determination of an appliance.

The present invention also provides the appliance determination system in which the database is configured so as to be able to store an operation condition of an individual household; and the appliance determination unit compares determination criteria of an individual household with an output from the integration unit on the basis of the reference data and the operation condition, thereby determining which appliance is using a fluid.

The configuration enables more appropriate determination of an appliance.

Moreover, the present invention provides a flow measurement apparatus comprising a flow measurement unit that measures an instantaneous amount of fluid flowing through a passageway; a determination zone setting unit that has a first classification condition for determination zone for classifying and setting a flow waveform achieved at the time of activation of an appliance, a second classification condition for determination zone for classifying and setting a flow value achieved at the time of activation of an appliance, and a third classification condition for determination zone for classifying and setting a continual operating time of an appliance and that creates a determination zone in a matrix pattern by combination of the respective classification conditions for determination zone; a determination zone storage unit that allocates the flow measured by the flow measurement unit to each of the determination zones classified by the determination zone setting unit and stores the thus-allocated flow as the number of occurrences of a flow; a clock unit that clocks a learning period during which processing for allocating a flow to the determination zone storage unit is performed; a grouping unit that registers a determination zone for use in determining an appliance, by means of the number of occurrences of a flow for each determination zone stored in the determination zone storage unit within a period clocked by the clock unit and that performs grouping by associating an appliance being used for each registered determination zone; a determination zone decision unit that determines whether or not the flow measured by the flow measurement unit after grouping conforms to a registered determination zone; an integration unit that integrates a flow value for each registered determination zone when the determination zone decision unit determines that the flow conforms to the registered determination zone; and a determination zone update unit that performs registration determination zone update processing when the determination zone decision unit determines that the flow does not conform to the registered determination zone.

Specific constituent elements are specified in order to realize the present invention. A use record of predetermined period is allocated to the determination zone created by combination of a plurality of characteristic flow properties, thereby accumulating stored data. The determination zones grouped on the basis of stored data are registered according to an appliance. A determination is made as to whether or not a flow conforms to the registered determination zone. When the flow conforms to the registered determination zone, a value of a used flow is integrated on the basis of the registered determination zone. When the flow does not conform to the registered determination zone, processing for updating the registered determination zones is performed. Therefore, it becomes possible to perform detailed determination of an appliance in accordance with a plurality of determination conditions. Further, there is yielded an effect of making it possible to more accurately determine a gas appliance on the basis of an appliance to be actually used, without being affected by an individual difference among different gas appliances, aged deterioration of a gas appliance, and the like.

The present invention also provides the flow measurement apparatus in which the determination zone setting unit has a learning unit that performs measurement for a predetermined period by use of a flow value classification registered as the second classification condition for determination zone and that changes a flow classification of the second classification condition for determination zone to an optimum flow value classification after performance of measurement for the predetermined period.

When a storage pattern of an operation record based on the determination zone created by use of an initially-registered flow value classification is determined to be inappropriate, the flow value classification is changed, to thus re-ascertain the storage pattern of the operation record. Hence, an optimum determination zone can be set, and more accurate determination of a gas appliance can be fulfilled.

The present invention also provides the flow measurement apparatus in which the determination zone setting unit has a learning unit that performs measurement for a predetermined period by use of a time classification registered as the third classification condition for determination zone and that changes the time classification of the third classification condition for determination zone to an optimum time classification after performance of measurement for the predetermined period.

When a storage pattern of an operation record based on the determination zone created by use of an initially-registered time classification is determined to be inappropriate, the time classification is changed, to thus re-ascertain the storage pattern of the operation record. Hence, an optimum determination zone can be set, and more accurate determination of a gas appliance can be fulfilled.

The present invention provides the flow measurement apparatus in which the determination zone setting unit has a learning unit that automatically changes a flow value classification and a time classification to an optimum classification when an operation record storage pattern based on initially-created determination zones cannot be grouped in correspondence with the number of registered appliances.

When a storage pattern of an operation record based on the initially-created determination zone is determined to be inappropriate, the flow value classification or the time classification is changed, to thus re-ascertain the storage pattern of the operation record. Hence, an optimum determination zone can be set, and more accurate determination of a gas appliance can be fulfilled.

The present invention also provides a flow measurement apparatus comprising a flow measurement unit that measures an amount of fluid flowing through a passageway; a flow information storage unit for storing object data that describe, in an associating manner, a flow value measured by the flow measurement unit and a measurement time during which the flow value is measured; and an object data classification unit that takes first object data stored in the flow information storage unit as reference data and that classifies second object data into respective reference data groups on the basis of a characteristic value showing relevance between a measured flow value of the second object data and a flow value of the reference data.

The present invention enables classification of an appliance being used on the basis of a measured flow value and from the viewpoint of a flow property. Accordingly, the flow measurement apparatus can also be additionally provided with a function that serves as a precondition for imparting an applied expansion function, such as a learning function for determining an appliance being used.

Moreover, the present invention also provides the flow measurement apparatus in which the object data classification unit can use, as the characteristic value, a coefficient of correlation between the measured flow value of the second object data and a flow value of the reference data.

The configuration readily enables computation for classifying an appliance by means of a common correlation coefficient.

The present invention further provides the flow measurement apparatus in which the object data classification unit can also use, as the characteristic value, the correlation coefficient and a flow value of the reference data.

The configuration enables more accurate, detailed classification of appliances being used.

The present invention provides a flow measurement apparatus comprising a flow measurement unit that measures an amount of fluid flowing through a passageway; a flow information storage unit for storing object data that describe, in an associating manner, a flow value measured by the flow measurement unit and a measurement time during which the flow value is measured; and an object data classification unit that takes first object data stored in the flow information storage unit as reference data and that classifies second object data into respective reference data groups on the basis of a plurality of characteristic values showing relevance between a plurality of measured flow values of the second object data and a plurality of flow values of the reference data corresponding to times during which the plurality of flow values are measured.

The present invention enables classification of an appliance being used on the basis of a measured flow value and from the viewpoint of a flow property. Accordingly, the flow measurement apparatus can also be additionally provided with a function that serves as a precondition for imparting an applied expansion function, such as a learning function for determining an appliance being used. Moreover, it becomes possible to more accurately, finely classify an appliance being used.

Further, the present invention also provides a flow measurement method implemented by the flow measurement apparatus and a program for causing a computer, which controls the flow measurement apparatus, to implement the flow measurement method.

Advantages of the Invention

According to the flow measurement apparatus of the present invention, a use record of predetermined period is allocated to the determination zone created by combination of a plurality of characteristic flow properties, thereby accumulating stored data; and the determination zones grouped on the basis of stored data are registered. A value of a used flow is integrated on the basis of the registered determination zone. Therefore, it becomes possible to perform detailed determination of an appliance in accordance with a plurality of determination conditions. Further, there is yielded an effect of making it possible to more accurately determine a gas appliance on the basis of an appliance to be actually used, without being affected by an individual difference among different gas appliances, aged deterioration of a gas appliance, and the like.

In another case, measurement data are temporarily brought back to the management company, and the data are subjected to data processing by using data compatible with a plurality of types of appliances as a reference value, whereby more accurate determination of an appliance can be fulfilled. Alternatively, data are intensively managed by a processing terminal of the management company by use of a communication device, whereby an improvement in accuracy can be attained.

Moreover, the present invention enables addition of a learning function compliant with classification of a gas appliance that starts being newly used. An appliance being used can be classified and determined on the basis of a measured flow value and from the viewpoint of a flow property.

BRIEF DESCRIPTION OF THE DRAWINGS

FIG. 2 A view showing an example determination zone storage part that generates a plurality of determination zones by combination of flow properties of gas appliances.

FIG. 7 A view showing a database employed in the appliance determination system of the second embodiment of the present invention.

FIG. 10 A conceptual rendering showing reference data, object data, and correlation coefficients used in various embodiments of the present invention.

FIG. 13 A conceptual rendering showing an idea for classifying the object data into three reference data groups in the third embodiment.

FIG. 14 A conceptual rendering showing an idea for classifying the object data into seven reference data groups in a fourth embodiment.

DESCRIPTIONS OF THE REFERENCE NUMERALS

10 FLOW MEASUREMENT APPARATUS
11 GAS SUPPLY LINE (PASSAGEWAY)
12 ULTRASONIC FLOW METER (FLOW MEASUREMENT UNIT)
14 STORAGE UNIT
14a WAVEFORM INFORMATION STORAGE UNIT
14b STARTING FLOW RATE STORAGE UNIT
14c DURATION STORAGE UNIT
15 CLOCK UNIT
16 DETERMINATION ZONE STORAGE UNIT
17 DETERMINATION ZONE SETTING UNIT
18 GROUPING UNIT
19 DETERMINATION ZONE DECISION UNIT
20 INTEGRATION UNIT
21 TO 25 GAS APPLIANCES (APPLIANCES)
26 Determination Zone Decision Unit
27 LEARNING UNIT
30 APPLIANCE DETERMINATION UNIT
100 FLOW MEASUREMENT APPARATUS
200 DATA COLLECTION TERMINAL
300 GAS APPLIANCE MANAGER
310 COMMUNICATION UNIT
320 DETERMINATION UNIT
330 DISPLAY UNIT
340 MANAGEMENT INFORMATION STORAGE UNIT
407 ULTRASONIC FLOW METER (FLOW MEASUREMENT UNIT)
408 MEASURED FLOW INFORMATION STORAGE UNIT
410 REFERENCE DATA GROUP STORAGE UNIT
411 APPLIANCE DETERMINATION MEANS
413, 414, 415 GAS APPLIANCE
416 GAS METER (FLOW MEASUREMENT APPARATUS)

BEST MODES FOR IMPLEMENTING THE INVENTION

Embodiments of the present invention will be described hereunder by reference to the drawings. Incidentally, the present invention is not restricted to the embodiments.

First Embodiment

Figure 1:
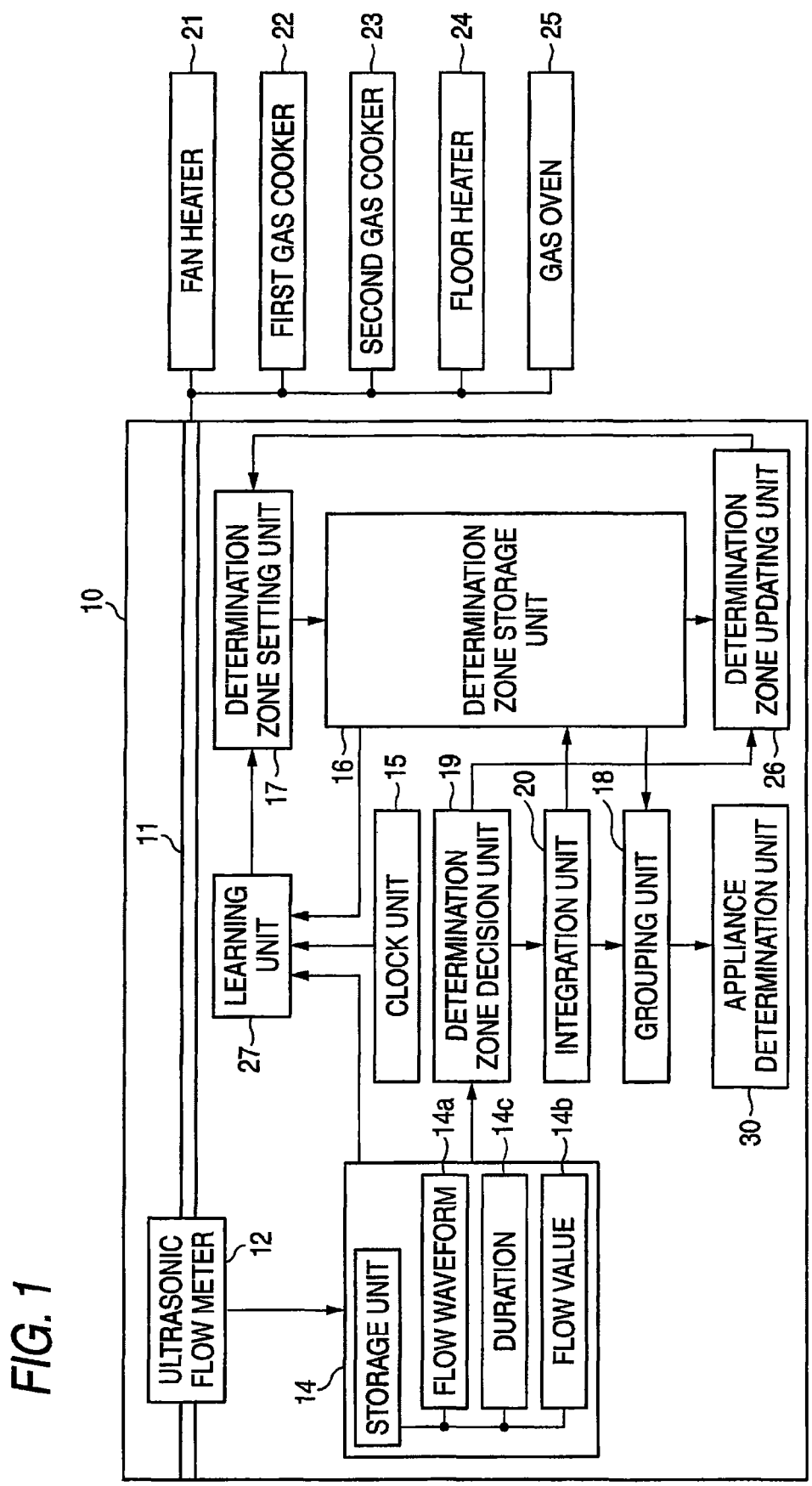
FIG. 1 A schematic block diagram showing a flow measurement apparatus of a first embodiment of the present invention.

As shown in FIG. 1, a flow measurement apparatus 10 of a first embodiment of the present invention has a flow measurement unit 12 that measures an amount of fluid flowing through a passageway; a determination zone setting unit 17 that assigns a flow measured by the flow measurement unit to any of determination zones classified according to a predetermined condition (a first condition); a determination zone storage unit 16 that stores information about the respective zones; a grouping unit 18 that performs grouping (under a second condition) by collecting determination zones, which occur at high frequencies, in accordance with determination-zone-specific storage values stored in the determination zone storage unit 16; and an integration unit 20 that integrates flow values or the number of occurrences of a flow value occurred. An appliance determination unit 30 provided in the flow measurement apparatus 10 determines an appliance by use of a result made by grouping the flow value or the number of occurrences of a flow value integrated by the integration unit 20. The first condition and the second condition will be described later.

The flow measurement apparatus 10 has an ultrasonic flow meter 12 that measures the amount of gas flowing as a fluid in the gas supply line 11 serving as a fluid measurement unit; and a storage unit 14 for storing flow information including a waveform information storage unit 14a which recognizes a flow waveform at the time of activation of an appliance from an instantaneous flow rate measured by the ultrasonic flow meter 12 and which classifies and stores the thus-recognized flow waveform as waveform information according to a predetermined waveform category, a starting flow rate storage unit 14b which likewise stores the instantaneous flow rate measured by the ultrasonic flow meter 12 as a starting flow rate at the time of activation of an appliance, and a duration storage unit 14c which stores a duration of usage on the basis of the instantaneous flow rate measured by the ultrasonic flow meter 12.

The flow measurement apparatus further has a determination zone storage unit 16 that stores as operation record storage data, within a predetermined period of time, appliance information defined on the basis of various types of pieces of flow information that have been achieved at the time of activation of appliances and stored in the storage unit 14. A flow occurred as a result of use of a gas appliance is measured within a learning period counted by the clock unit 15, and a measured value is stored as operation record data.

Specifically, three zone classification conditions are used as the first condition. As shown in FIG. 2, there is provided a determination zone setting unit 17 that has a first classification condition for determination zone that sets, in a classifying manner, a characteristic flow property of a gas appliance; for instance, a flow waveform acquired at the time of activation of an appliance, a second classification condition for determination zone that sets, in a classifying manner, a flow value achieved at the time of activation of an appliance, and a third classification condition for determination zone that sets, in a classifying manner, a continual operating time of an appliance; and that makes a determination zone in a matrix pattern by combination of the respective classification conditions for determination zone.

Operation record information determined from the plurality of pieces of flow information stored in the storage unit 14 is allocated to determination zones classified in detail by the determination zone setting unit 17. Information is stored every time the gas appliance is used and stored as operation record information in the determination zone storage unit 16 within a learning period counted by the clock unit 15.

The operation record data stored in the determination zone storage unit 16 are output at a point in time when the learning period has completed as a result of countup of the clock unit 15. On the basis of the number of occurrences of a flow in each determination zone, the grouping unit 18 groups a determination zone by using; for instance, as a second condition, a sorting condition for sorting top "n" determination zones that occur many times or a sorting condition for sorting a determination zone that occurs a previously-determined number of times. The grouping unit 18 also sorts a determination zone by using, as the second condition, a sorting condition for sorting a central area of the distribution of occurrence; registers the sorted determination zone as a determination zone for use in subsequent determination of an appliance; and sets a gas appliance corresponding to the registered determination zone, thereby grouping the determination zones for each gas appliance.

The grouping means 18 continually groups appliance-specific determination zones. When completed grouping, the grouping means can also prepare for storing data at the time of the next update processing or re-registration processing by initializing the operation record data stored in the determination zone storage means 16.

When processing enters appliance determination operation as a result of completion of registration of the determination zone, a determination zone decision unit 19 decides, from an instantaneous flow rate measured by the ultrasonic flow meter 12, whether or not appliance information determined from various pieces of flow information stored in the storage unit 14 matches the registered determination zone. When the appliance information matches a decision result, an integration unit 20 integrates a flow measured by the ultrasonic flow meter 12 for each registered zone. An integrated value can be determined in accordance with an individual determination zone by means of integration processing of the integration unit 20. The grouping means groups the integrated values, to thus grasp actual use conditions of a gas appliance on an appliance-by-appliance basis, whereby the integrated value can be utilized for a variety of applications; for instance, an appliance-specific bill and security service.

When the appliance information does not match the result of decision made by the determination zone decision unit 19, there are putative causes, such as use of an appliance other than the registered gas appliances, a flow change induced by aged deterioration, and occurrence of a leakage. In this case, a determination zone update unit 26 aborts the appliance determination operation and again performs operation for registering determination zones. The determination zones are updated by operation record storage data stored during a predetermined learning period, and determination zones are newly registered. When appliance-specific grouping has thus completed, the appliance determination unit 30 resumes appliance determination operation. Grouped states correspond to identically-hatched areas in FIG. 2.

When a flow that does not match a determination zone even in determination zone update processing occurs, occurrence of a leakage is conceived. Hence, processing pertaining to a predetermined leakage detection processing mode is performed, whereby a precise leakage check is performed.

There is also provided a learning unit 27 that, when a storage pattern of operation record data is determined to be stored, while leaning to some of determination zones, and be inappropriate during determination zone registration operation, makes a change to a flow value classification that is the second classification condition for determination zone of the determination zone setting unit 17 or a time classification that is the third classification condition for determination zone of the same, to thus set an optimum classification condition for determination zone under which the storage pattern of operation record data becomes appropriate. Moreover, the learning unit 27 also has a function of automatically changing the flow value classification or the time classification to an optimum zone when grouping corresponding to the number of registered appliances cannot be performed in connection with the storage pattern of operation record based on the initially-created determination zones.

A plurality of gas appliances (appliances) 21 to 25 installed in each house are connected to downstream positions of the gas supply line 11 with respect to the ultrasonic flow meter 12.

The plurality of gas appliances 21 to 25 include a gas fan heater 21, a first gas cooker 22, a second gas cooker 23, a floor heating 24, and a gas oven 25.

The ultrasonic flow meter 12 has a flow computation unit (not shown); causes an ultrasonic wave to propagate through a measurement passageway (not shown) connected to the gas supply line 11; measures a propagation time of the ultrasonic wave; and determines a flow rate of a gas from measured information.

The measurement passageway assumes an angular cylindrical shape having a rectangular cross section, and ultrasonic transceivers are provided on respective mutually-opposing short-side side surfaces. The ultrasonic transceivers are arranged along lines crossing each other at a predetermined angle with respect to the direction of a gas flow in the measurement passageway so as to alternately transmit and receive an ultrasonic wave.

The flow computation unit calculates a flow differential value equivalent of a change in gas flow from a gas flow detection signal from the ultrasonic flow meter 12.

The determination zone setting unit 17 selects a plurality of flow properties from characteristic flow properties of the plurality of gas appliances 21 to 25, thereby forming determination zones classified in detail by combination of the plurality of flow properties.

Flow properties of the plurality of gas appliances 21 to 25 include classification made by a determination pertaining to the presence/absence of an overshoot or the steepness or gentles of a gradient in the flow waveforms of the plurality of gas appliances 21 to 25 appearing at the time of activation of the appliances; classification of a starting flow rate made at predetermined intervals; and classification of a continual operating time made at predetermined intervals.

During use of the plurality of gas appliances 21 to 25 in a predetermined learning period, the determination zone storage unit 16 performs first-stage classification on the basis of presence/absence of an overshoot appearing at the time of activation of an appliance and steepness or gentleness of a rise gradient, which are determined from the instantaneous flow rate measured by the ultrasonic flow meter 12; subsequently performs second-stage classification on the basis of flow ranges that are determined while a stable flow achieved after activation is taken as a starting flow rate and that are classified at predetermined intervals; and performs third-stage classification on the basis of time ranges determined by measuring a continual operating time from activation of an appliance until deactivation of the same and classifying the thus-measured operating time at predetermined intervals. The flow information acquired in accordance with the classification procedures is allocated to determination zones formed by the determination zone setting unit 17 and stored as a waveform, a predetermined flow range, and the number of occurrences of a time range.

The presence/absence of an overshoot in the starting flow rate waveform and the steepness or gentleness of a gradient will be described hereunder.

Figure 3:
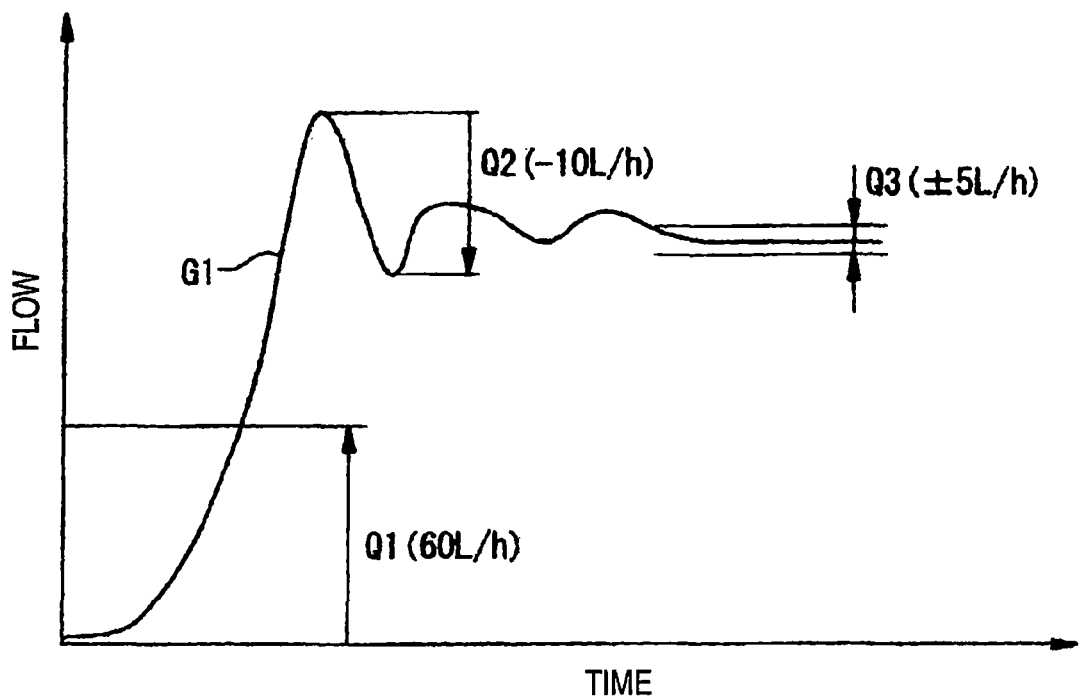
FIG. 3 A graph describing criteria for determining activation of a gas appliance, an overshoot, and safety.

Criteria for determining activation of a gas appliance, an overshoot, and safety will be described on the basis of a graph G1 shown in FIG. 3.

Determination as to whether or not a gas appliance is activated will first be described.

When the ultrasonic flow meter 12 measures a gas flow, the gas appliance is determined to be activated when a flow change Q1 in the measured gas flow is a predetermined flow (e.g., +5 to +400 L (liter))/h (hour) and when an optimum range of the flow change is +20 to +80 L (liter)/h (hour) or more.

A determination as to whether or not the gas flow is an overshoot will now be described.

So long as a flow change Q2 comes to −10 L/h or more only once before the gas flow becomes stable after the gas appliance has been determined to be activated, the gas flow is determined to be an overshoot. In addition, there are methods for determining occurrence of an overshoot by changing a time width during which the flow change Q2 is measured or comparing a stable flow achieved when the flow has become stable with a peak flow achieved at the time of an overshoot.

A determination as to whether or not the gas flow is stable will now be described.

In a case where a flow change Q3 in gas flow converges into a predetermined flow (e.g., ±5 L/h; namely, a flow increase/decrease achieved within a predetermined period of time is in 10 L/h) after the gas appliance has been determined to be activated, the gas flow is determined to be stable, and the flow is taken as a starting flow rate.

Figure 4:
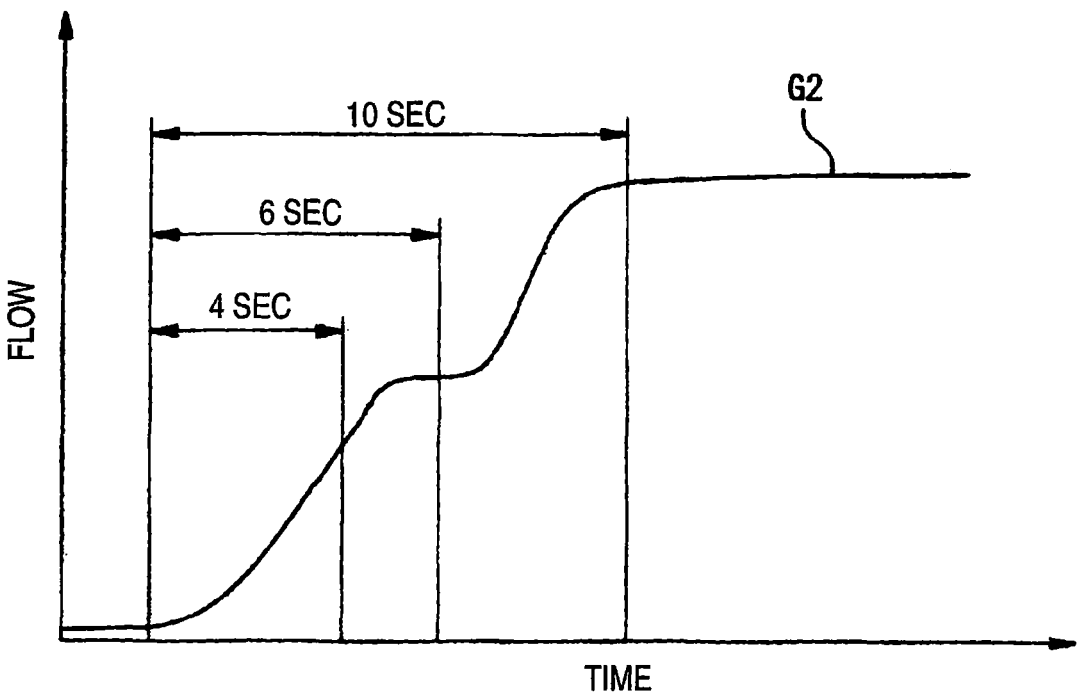
FIG. 4 A graph describing a criterion for determining steepness and gentles of a gas flow slope arising at the time of activation of a gas appliance.

Criteria for determining steepness or gentleness of a gradient of a gas flow arising at the time of activation will be described on the basis of a graph G2 shown in FIG. 4.

As shown in a graph G2, when the gas flow has a relationship of a four-second differential flow<a six-second differential flow<a ten-second differential flow in accordance with elapse of a time; namely, four seconds, six seconds, and ten seconds, the gradient of the gas flow is determined to be mild (gentle). Further, in relation to the determination method, there is also another determination method for determining a gradient by combination of measurement times, like a four-second differential flow<a six-second differential flow<an eight-second differential flow.

In this case, when the gas flow does not have a relationship of a four-second differential flow<a six-second differential flow<a ten-second differential flow, the gradient of the gas flow is determined to be steep. When there stands a relationship of a four-second differential flow<a six-second differential flow<a ten-second differential flow, the gradient of the gas flow is determined to be gentle.

Figure 5:
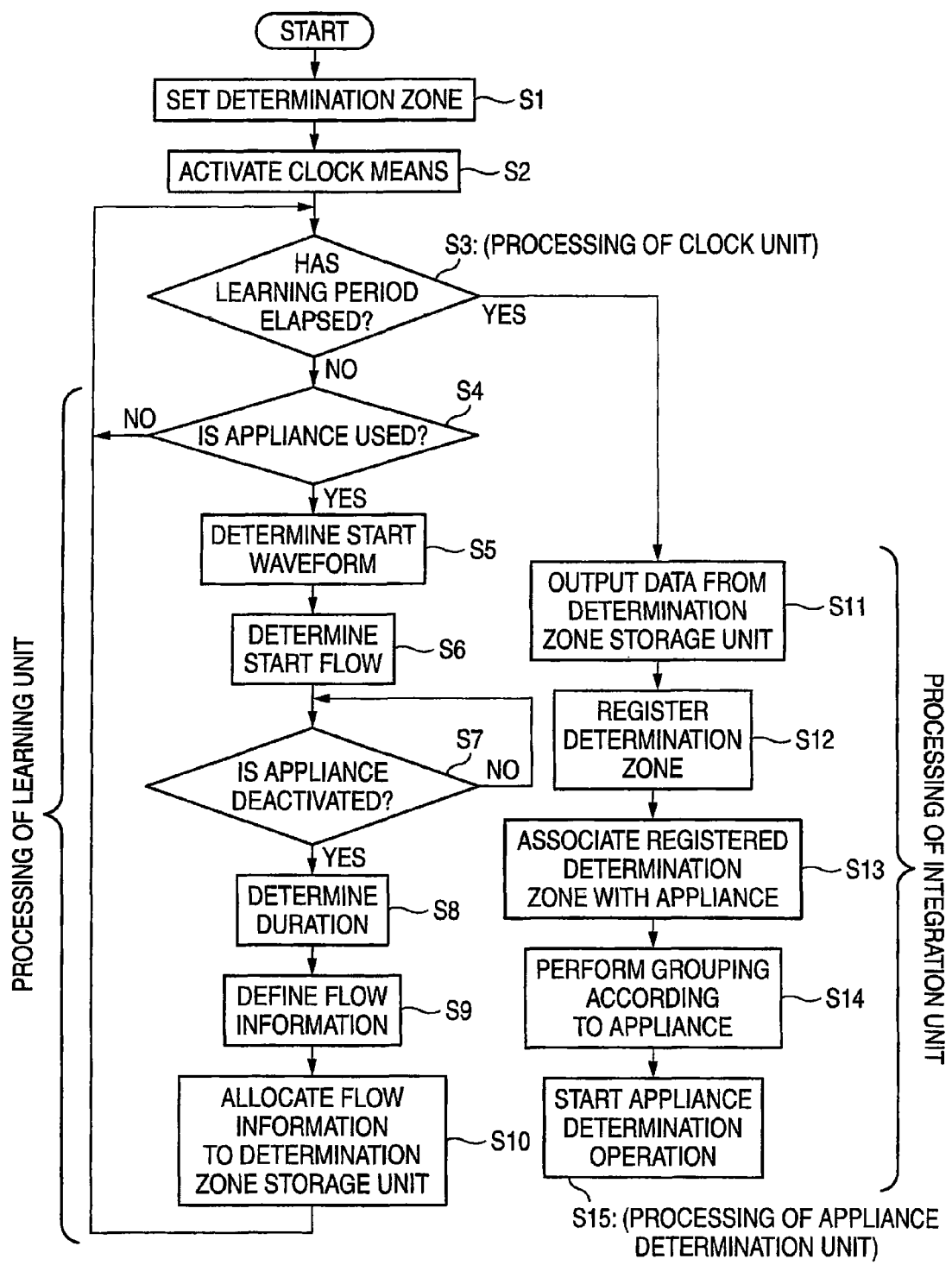
FIG. 5 A flowchart showing an example in which the flow measurement apparatus of the first embodiment of the present invention determines a plurality of gas appliances.

Operation of the flow measurement apparatus 10 configured as mentioned above will be described by reference to a flowchart shown in FIG. 5.

First, a plurality of characteristic flow properties are selected from flow properties of a plurality of gas appliances to be determined in step 1 (S1) as processing for setting a determination zone. In the present embodiment, a flow waveform and a starting flow rate, which are achieved at the time of activation, and a continual time from activation until deactivation are selected as shown in FIG. 2. A starting flow rate and a continual time are set at predetermined intervals in each of flow waveforms, to thus be classified in a matrix pattern, whereby determination zones are made.

Next, performance data pertaining to the gas appliance acquired in a learning period by operating the clock unit 15 that counts a predetermined learning period are stored (S2). In step 4 (S4), a determination is made as to whether or not the gas appliance is activated. When a gas appliance is not activated, the flow measurement apparatus enters a standby condition. When a gas appliance is activated, the flow measurement unit 12 detects a transient flow change appearing at the time of activation on the basis of an instantaneous flow rate; determines which one of previously-determined waveform categories corresponds to the flow change; and stores the flow change in the waveform information storage unit 14a of the storage unit 14 (S5). In relation to the waveform categories, classification is performed on the basis of whether a flow change appearing at a leading edge is gentle or steep or whether or not the flow change involves an overshoot.

A stable flow achieved after the leading edge is now determined as a starting flow rate in step 6 (S6); a determination is made as to which one of the previously-determined flow categories corresponds to the starting flow rate; and a determination result is stored in the starting flow rate storage unit 14b of the storage unit 14. A timer (not shown) that counts an operating time simultaneously with activation of an appliance is activated, and a check is made in step 7 (S7) as to whether or not the appliance is stopped. When the appliance is deactivated, a continual operating time is measured in step 8 (S8); a determination is made as to which one of the previously-determined time classifications corresponds to the continual operating time; and a determination result is stored in the duration storage unit 14c of the storage unit 14.

A variety of pieces of information stored in the storage unit 14 in step 9 (S9) is determined as flow information about an activated appliance. The flow determination information is allocated to a corresponding determination zone among the plurality of determination zones, which have been set by the determination zone setting unit 17, in the determination zone storage unit 16 and stored as the number of occurrences of a flow in an appliance (S10).

Processing pertaining to the step is iterated in a learning period counted by the clock unit 15. Iterations are stored as the number of occurrences of a flow in accordance with an individual determination zone of the determination zone storage unit 16 every time use of an appliance is ascertained.

After the learning period elapses as a result of counting-up of the clock unit 15, appliance usage record data stored in the determination zone storage unit 16 are output in accordance with an individual determination zone, and operation record of the gas appliance used in the learning period can be patterned and ascertained in accordance with an individual determination zone differentiated by a characteristic flow property (S11). A determination is made from a usage record result patterned on a per-determination-zone basis by use of, as the second condition, a condition pertaining to which one of the determination zones has a high usage record, and a determination zone having a high usage record is registered, whereby subsequent appliance determination operation can be accurately performed (S12). A conceivable method as determination criteria employed at the time of registration of the determination zone include selection of top "n" determination zones involving a large number of occurrences, selection of a determination zone involving a predetermined number of occurrences, and selection of a central area of a distribution pertaining to the number of occurrences.

Next, a corresponding gas appliance is registered in accordance with an individual determination zone registered in step 13 (S13). Correspondence between the registered determination zone and the appliance may also be determined from a classification condition for determination zone and registered by means of manual operation. Alternatively, corresponding gas appliances may also be registered by one operation at a point in time when a determination zone, where a corresponding gas appliance is stored in advance in accordance with an individual determination zone, is registered.

When a corresponding gas appliance is registered for each registered determination zone, determination zones are grouped for each appliance and set as criteria which will be used for determining an appliance in subsequent operations (S14).

When appliance-specific determination zones are set, the appliance determination operation is commenced. A flow change resultant from use of a gas appliance, which will subsequently arise, is detected, and a determination is made as to whether or not the thus-detected flow change conforms to any of the registered determination zones. When the flow change conforms to any of the registered determination zones, a flow value is integrated for each registered determination zone. When the flow change is determined not to conform to the registered determination zone, there is performed processing for updating a registered determination zone (S15).

When an appliance is determined with high precision as mentioned above, it becomes possible to calculate a gas bill after determining a single or a plurality of operating gas appliances. Gas fees can be set in detail in accordance with operating time or operating condition of the gas appliance, and the like. Accordingly, it becomes possible to fulfill various requests from the user.

When an appliance is determined with high precision, detection of an anomaly also becomes easy, so that an anomalous gas supply, which may lead to an accident, can be early detected.

When a plurality of gas appliances are connected to a gas passageway, data are stored in accordance with an individual determination zone, whereby fees corresponding to respective gas appliances can also be set.

The gas fee calculation system also has a flow computation unit that computes a flow differential value equivalent of a rate of time change in flow value from flow values cyclically measured a plurality of times by the flow measurement unit. The operation determination unit may also be configured so as to generate operating condition information about a gas appliance from the flow differential value and the determination information about the gas appliance.

In the present embodiment, the flow values integrated by the integration unit 20 are grouped by the grouping unit 18. However, data grouped by the grouping unit 18 may also be integrated by the integration unit 20.

Second Embodiment

A second embodiment of the present invention will be described hereunder.

Figure 6:
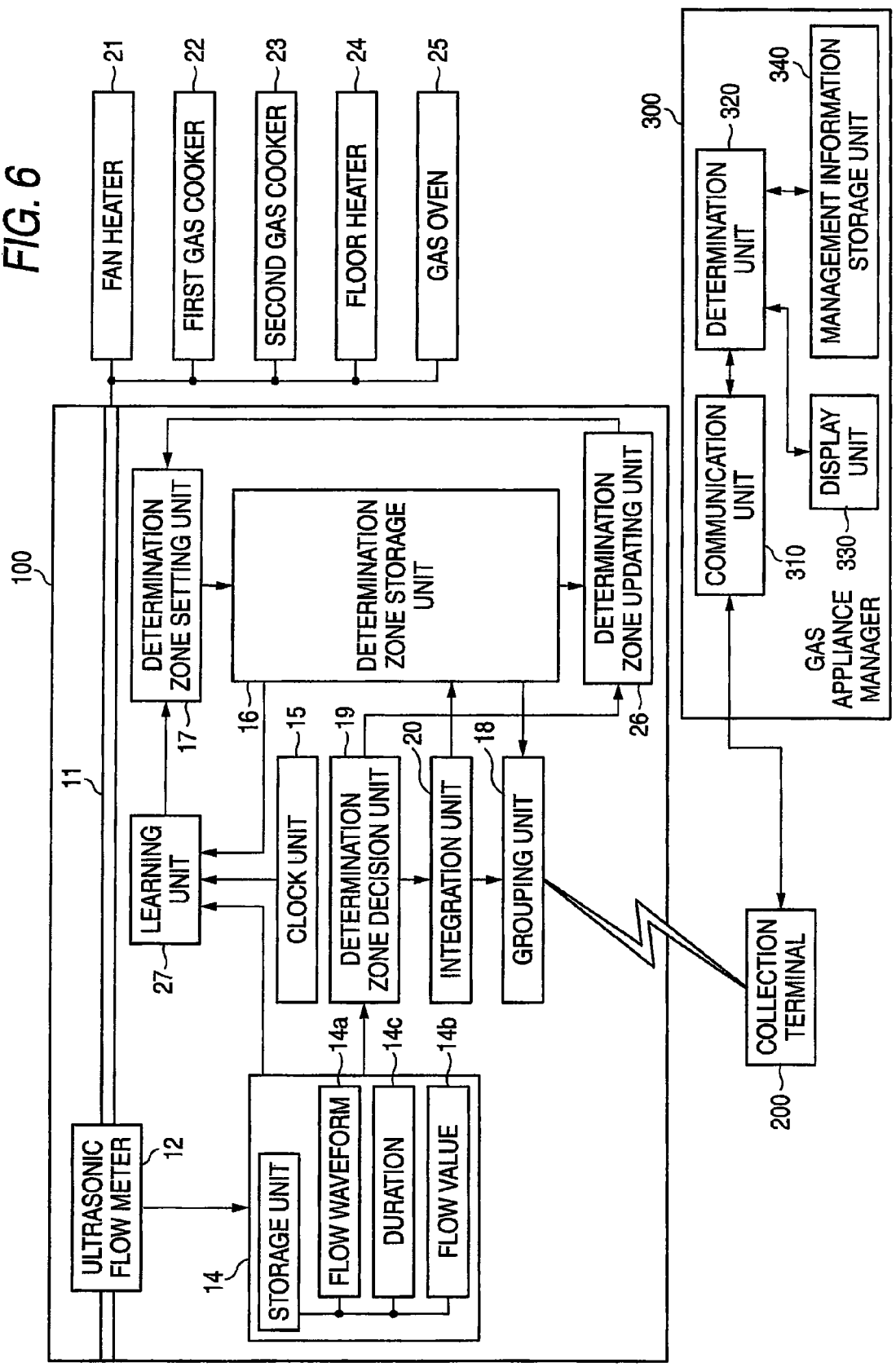
FIG. 6 A view showing an appliance determination system of a second embodiment of the present invention.

As shown in FIG. 6 that provides an entire view of an appliance determination system of the present invention, the system is characterized in that the appliance determination unit is provided outside of the flow measurement apparatus (the gas meter). The system is characterized by including an appliance determination unit that groups the flow values integrated by the integration unit 20 shown in FIG. 1 in the first embodiment by means of the grouping unit 18 and that inputs an output from the grouping unit or the integration unit of the flow measurement apparatus to the database where the reference data are stored, thereby determining an appliance using a fluid. In the present embodiment, the appliance determination unit is not implemented within the flow measurement apparatus 100 but by a gas appliance manager 300, such as that provided by a gas management company.

The appliance determination system has the flow measurement apparatus 100, a data collection terminal 200, and a gas appliance manager 300. The gas appliance manager 300 includes a communication unit 310, a determination unit 320, a display unit 330, and a management information storage unit 340. Although the communication unit 310 acquires information about the flow measurement apparatus 100 from the data collection terminal 200, involvement of the data collection terminal 200 is not indispensable. For instance, acquisition of information directly from the communication unit (not shown) of the flow measurement apparatus 100 is also possible. The determination unit 320 is a unit that determines a gas appliance (a model of appliance) and operating condition and status of the gas appliance from acquired information, and the display unit 330 displays determination result information about the model and status of the gas appliance. The management information storage unit 340 is a unit that includes a database and that stores information required to determine the status of a gas appliance, such as 1. waveform information, 2. information about the type and number of appliances in each household, and 3. information about a family structure and a life pattern in connection with a variety of gas appliances. The management information storage unit will be described later.

Various modes for determining the status of a gas appliance determined by the gas appliance manager 300 are described. The status of a gas appliance acquired in the present invention is information (operation enable/disable information) used for determining whether to enable or disable additional operation and use of a gas appliance, and the information can be applied to security, such as management of maintenance inspection, and a notice of replacement of a gas appliance.

As of now, gas appliances in each household are usually inspected by safety inspection performed every three years, whereby a management company grasps the operating model and operating condition of a gas appliance and guarantees safety. However, many single-occupancy households and aged households are excluded from safety inspection under the status quo. Even in such a case, outdoor flow measurement performed by the management company and processing resultant data are performed as a result of application of the present invention, whereby high-precision safety inspection also becomes possible. For instance, since a mass-storage database is available, it becomes possible to determine a mode with high accuracy by checking not only data pertaining to general-purpose models but also data pertaining to old models or specific models, and early safety management, such as proactive warning for the ceasing of use of a gas appliance, becomes feasible.

However, fields of application of the invention are not particularly limited to security. The invention can also be applied to a marketing support service, such as an investigation about a user's preference by grasping an operating status.

Upon acquisition of information pertaining to the grouping unit 18 from the communication unit 310, the determination unit 320 refers to flow information about respective gas appliances stored in the management information storage unit 340, thereby determining an appliance with high accuracy. When a gas appliance is determined, a reference is made to discount rates of respective appliances, and a discounted gas fee is computed. Such a configuration enables provision of a service, such as a discount of a gas bill according to a gas appliance, so that establishment of a detailed billing system becomes possible.

FIG. 7 is a view showing an example of data pertaining to waveform information and flow variations pertaining to individual models among pieces of flow information about respective gas appliances stored in the management information storage unit 340 used herein. The manager 300 that is the property of the gas appliance management company updates the database 340. As shown in FIG. 7, an example database groups a plurality of sets of data (a first classification) as an appliance involving a waveform with a gentle leading edge, an appliance involving a waveform with a steep leading edge, an appliance involving a varying waveform, . . . . Further, there are also provided, as a database, data pertaining to a flow, an operation variation, a standard operating time (a duration), and its variation in connection with an individual appliance among the appliances involving gentle leading edges, such as a fan heater FH001 manufactured by Company A, a fan heater FH002 manufactured by Company A, . . . . A product number of an appliance can be specified by means of flow information acquired by the flow measurement apparatus 100.

For instance, in the embodiment shown in FIG. 7, when data are searched in a decreasing order of the number of occurrences from the largest number, there are stored Data 1 for which 1153 occurrences are counted within an operation range from 120 L/h to 140 L/h of a steep rise zone and an operating time range from 0 to 3 minutes. When Data 1 and data in the database 340 are compared with each other, a gas cooker GT001 manufactured by Company A has a match in terms of a feature of a start waveform, a flow range, and a standard operating time. Hence, an appliance can be specified as the gas cooker GT001 manufactured by Company A in connection with Data 1. Moreover, counts occurred around the zone of Data 1 are integrated, and an integration result falls within the range of variations in the flow of the gas cooker GT001 manufactured by Company A; hence, data falling in the zone are also specified as pertaining to the gas cooker GT001 manufactured by Company A. As mentioned above, three operating time classifications from 0 to 3 minutes within an operation range from 100 L/h to 160 L/h of a steep rise zone are grouped and determined as the gas cooker GT001 manufactured by Company A, whereby a gas appliance can be specified. Data are compared with the data of the database 340 in a decreasing sequence of the number of occurrences from the largest number, thereby determining an appliance.

Figure 8:
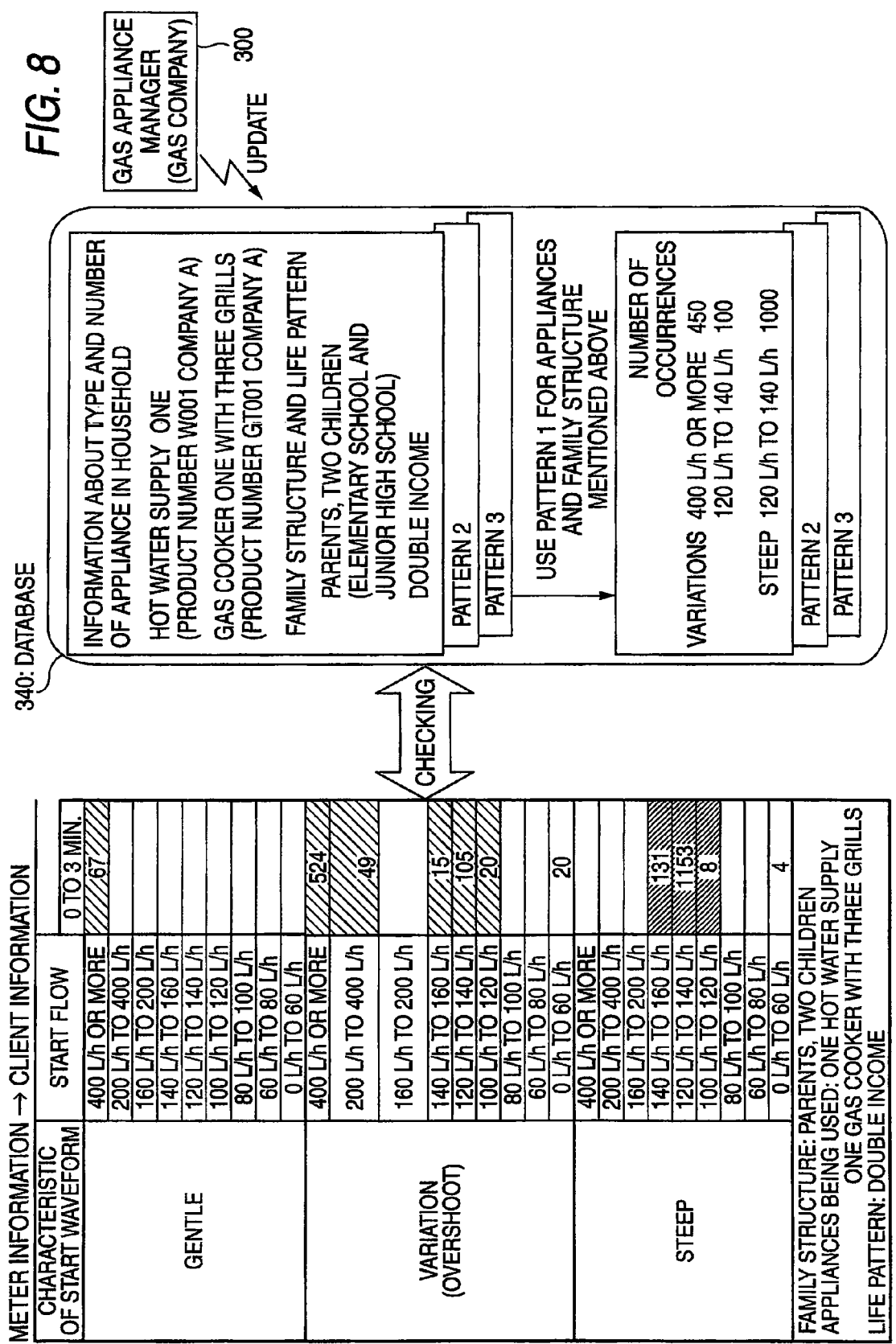
FIG. 8 A view showing the database employed in the appliance determination system of the second embodiment of the present invention.

FIG. 8 is a view showing example information pertaining to appliance type information and information about the number of appliances, a family structure, and a life pattern in connection with the household stored in the management information storage unit 340 used herein. Even in the embodiment, the manager 300 that is the property of the gas appliance management company updates the database 340. As shown in FIG. 8, an example database stores various conditions pertaining to a corresponding household, such as registered appliance type information, the number of appliances, a family structure, and a life pattern. Data pertaining to an actually-measured group are checked against the conditions, whereby an appliance can be specified. Even in the case of a household having one hot water supply and one gas cooker with three grills, measurement information varies in accordance with a family structure and a life pattern. For instance, in a household consisting of parents who go to work and two children (an elementary school child and a junior high school student), a heating device, such as a floor heater, is scarcely used in the daytime, and use of the heating device concentrates on morning and evening times. In contrast, in a household consisting of retired parents and two youngsters in their twenties, use of a heating device is continual in the daytime. Thus, a use pattern and an operating time classification of gas greatly change depending on a household. Even in relation to these pieces of information, the database includes unique data. An example pattern is selected on the basis of the flow information acquired by the flow measurement apparatus 100, and the thus-selected data are checked against the measured data, whereby a product number of an appliance can be specified.

For instance, in the embodiment shown in FIG. 8, information about a gas appliance being used, a family structure, and life pattern information are added as the second condition to the information collected by the flow measurement apparatus (meter information), whereby client data are generated. The database 340 stores a plurality of sets of data pertaining to a common gas use pattern in connection with the family structure and the gas appliance used. Accordingly, a matching pattern is searched by checking the client data against data pertaining to the gas use pattern of the database. On the basis of data pertaining to a matching pattern, the determination unit 320 can specify, as operations of respective gas appliances, data pertaining to respective zones in which the client used the gas appliance. Thus, amounts of gas used in the respective zones and which gas appliances were used in the respective zones can be specified even from the client information and meter readings for which amounts of gas used are classified into predetermined classifications. It becomes possible to determine an appliance with high accuracy by accumulating a large number of sets of data in and updating a database pertaining to gas operation patterns. Even when new gas appliances are developed, the gas appliances can be specified by updating the database.

In the configuration, a corresponding appliance is retrieved, in accordance with a registered determination zone, from the database storing larger amounts of data. Therefore, determination criteria conforming to an appliance used and an actual operating status can be set, and more accurate determination of a gas appliance can be fulfilled.

Further, in the appliance determination system, the database stores, as reference data, previously-measured waveform data pertaining to individual appliances; and the appliance determination unit compares the reference data with an output from the integration unit or the grouping unit, thereby making it possible to determine which appliance is using a fluid. Thus, the present invention enables more appropriate determination of an appliance.

In the appliance determination system, model determination, which is simple but more accurate, can be performed even by use of a database that is removably attached to the data collection terminal. A database conforming to information; for instance, a family structure, a life pattern, and the number of registered appliances, can also be made removably attachable to the data collection terminal. Alternatively, a rewritable database can also be used. This database makes it possible for an operator who checks a meter to perform more appropriate processing during meter reading by a method, such as replacement of a memory card.

The configuration enables rewriting of reference data to which a reference is to be made to an appropriate database when necessary; hence, data compatible with a plurality of models can be used, whereby appropriate determination of an appliance can be performed. Moreover, the configuration is also effective even in a case where the data grouped in the flow measurement apparatus are again grouped by reference to a much greater database in the gas appliance manager 300.

Further, in the appliance determination system, the database is connected by way of the data collection terminal. However, the flow measurement apparatus and the gas appliance manager may also be connected by way of a communication line.

Since the configuration enables establishment of a connection with a database having a plurality of sets of data by way of a communication line, data compatible with a plurality of models can be used, and more appropriate determination of an appliance can be performed.

As mentioned above, according to the present embodiment, it is possible to determine an appliance on the basis of grouped characteristic quantities (a rise time, a flow value, and the like) by reference to the information and database pertaining to appliances in a household.

Waveform information conforming to appliances, types and the number of appliances in each household, operating time information conforming to a family structure and a life pattern, and the like, can be used as the database, whereby detection and measurement with higher accuracy become possible.

According to the invention, in the appliance determination system, the database is configured so as to be able to store an operating condition for each household. The appliance determination unit compares household-specific determination criteria with an output from the integration unit in accordance with the reference data and the operating condition, thereby determining which appliance is using a fluid.

The configuration enables more appropriate determination of an appliance.

Although an instantaneous flow rate is measured in the present embodiment, it goes without saying that a flow integrated every predetermined time periods may also be used.

Although measurement of a gas flow has been described in connection with the present embodiment, it goes without saying that the present embodiment can be applied to a fluid other than a gas.

Third Embodiment

A third embodiment of the present invention will now be described by reference to the drawings.

Figure 9:
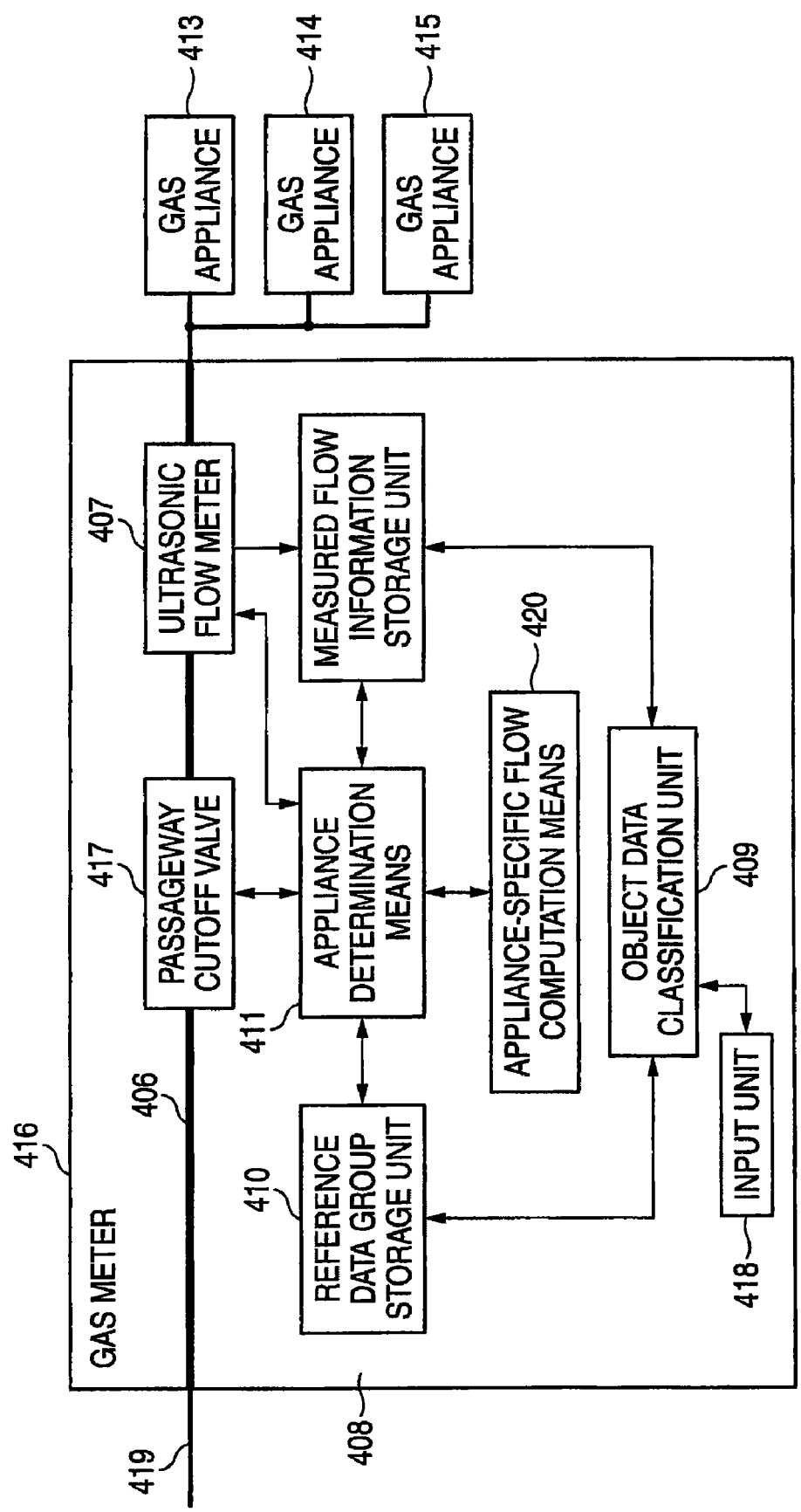
FIG. 9 A block diagram of a flow measurement apparatus of a third embodiment of the present invention.

FIG. 9 shows a block diagram of a gas meter 416 serving as a flow measurement apparatus of the third embodiment.

In FIG. 9, the gas meter 416 has a passageway 406, an ultrasonic flow meter 407, a measured flow information storage unit 408, an object data classification unit 409, a reference data group storage unit 410, and appliance determination means 411. Moreover, the gas meter 416 has an input unit 418 by way of which a meter installation service operator, or the like, performs input operation, a passageway cutoff valve 417 that is installed in the passageway 406 and that interrupts a gas in the event of emergency, and appliance-specific flow computation means 420.

The ultrasonic flow meter 407 emits an ultrasonic wave to a gas that flows as a fluid in the passageway 406, to thus measure the amount of the gas, and a common flow meter can be used for this. The measured flow information storage unit 408 stores a flow value measured by the ultrasonic flow meter 407 and object data for which a time during which the flow value is measured is described in an associated manner.

As will be described later, the object data classification unit 409 classifies (performs grouping of) the object data stored in the measured flow information storage unit 408 into any of a plurality of groups (reference data groups) stored in the reference data group storage unit 410.

As mentioned above, the reference data group storage unit 410 stores a plurality of groups (reference data groups) classified according to reference data. The more the number of types of reference data, the more the number of groups (the more grouping becomes detailed). The smaller the number of types of reference data, the smaller the number of groups (the more grouping becomes coarse). In addition to a case where gas appliances of the same type are classified into one group, there is also a case where only gas appliances having the same product number are classified into one group. In the meantime, it may be the case where gas appliances of different types (a fan heater, a floor heater, and the like) are classified into one group. In any event, gas appliances exhibiting predetermined relevance (similarity) are classified into one group from the viewpoint of a gas flow value (a flow value acquired every measurement time periods).

When the gas appliance of a reference data group can be determined to be a specific gas appliance (of a type or a product number), the appliance determination means 411 determines the gas appliance. The appliance-specific flow computation means 420 computes a flow for each gas appliance determined by the appliance determination means 411. Further, the gas meter 416 is connected to various gas appliances 413, 414, and 415, such as a gas cooker, a fan heater, and a floor heater, at downstream positions as well as to the gas passageway 419 at an upstream position.

Operation and action of the above-configured flow measurement apparatus will now be described particularly in relation to operation and action of the target data classification unit 409.

For instance, when the flow measured by the ultrasonic flow meter 407 undergoes a predetermined change from zero, one appliance is determined to have started operating. The measured flow information storage unit 408 starts storing the time change in measured flow achieved at this time as a measured flow value. Specifically, the measured flow information storage unit 408 associates the flow value measured at a predetermined measurement time interval (e.g., two seconds or the like) with a measurement time that starts from when the change has occurred, and stores the flow value as object data.

FIG. 10 describes, in a tabular format, data stored respectively in the measured flow storage unit 408, the target data classification unit 409, and the reference data group storage unit 410. The word "time" denotes a so-called measured time, and an interval between t(0), t(1), t(2), . . . , is set to an interval of; for instance, two seconds. The measurement time is associated with the "flow (measured flow value)" of "target data" and temporarily stored in the measured flow information storage unit 408. Moreover, the measurement time and the "flow (flow value)" of the "reference data" are associated with each other and stored in the reference data group storage unit 410. In the present embodiment, although one reference data group (Q0) to Q(5)) is provided, a plurality of groups are actually stored in the reference data group storage unit 410.

Although one or many of the reference data groups may also be previously stored as one type of default in the reference data group storage unit 410, the object data classification unit 409 may automatically create the data group. Specifically, When newly measured, acquired object data do not fulfill predetermined requirements in relation to any of existing reference data previously stored in the reference data group storage unit 410 (when predetermined relevance is not achieved; when a correlation coefficient to be described later does not fulfill the requirements), the object data classification unit 409 sets newly-acquired object data as reference data. The object data referred to in this case means first object data. The object data classification unit 409 stores the object data as reference data in the reference data group storage unit 410.

In the meantime, when newly measured, acquired object data fulfill predetermined requirements in relation to any of existing reference data previously stored in the reference data group storage unit 410 (when predetermined relevance is achieved; when a correlation coefficient to be described later fulfills requirements), the object data classification unit 409 automatically classifies newly-acquired object data into a group (a reference data group) of the reference data fulfilling the requirements. The object data referred to in this case are second object data.

Figure 11:
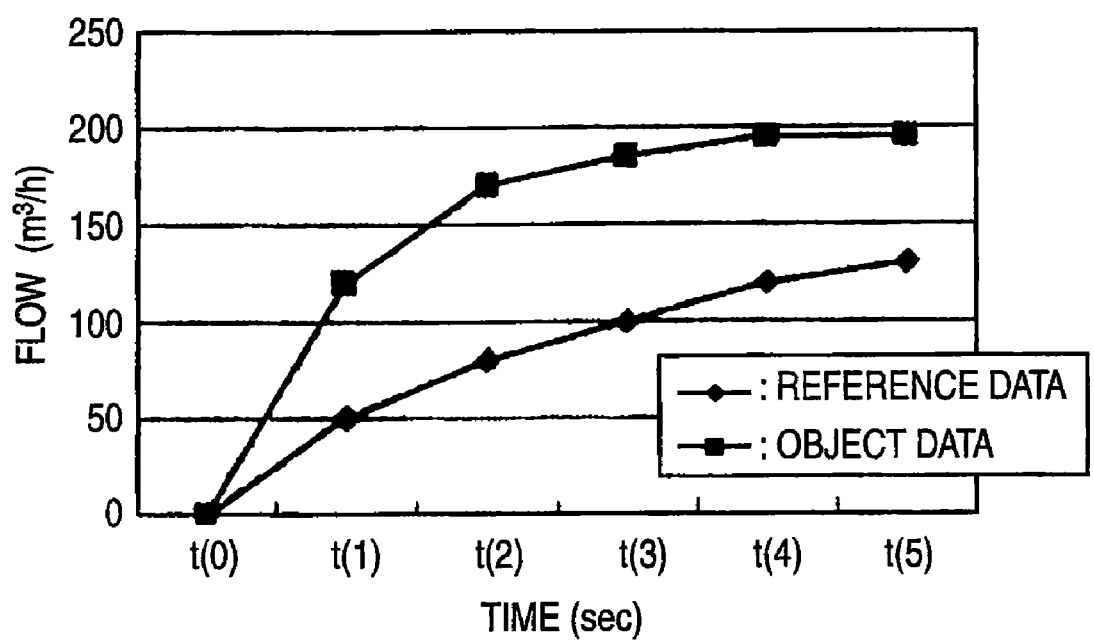
FIG. 11 A graph showing a relationship between reference data and object data.

FIG. 11 shows example reference data and example object data in the form of a graph. As mentioned above, when relevance exists between the acquired object data and the existing reference data (when relevance exists between the two graphs in FIG. 11), the flow measurement apparatus of the present invention classifies (performs grouping) for each gas appliance having a similar flow characteristic with the assumption that a gas appliance having a flow property similar to that of the gas appliance in the reference data (the appliance is not limited to an appliance of the same type or with the same product number) is used. This function is a so-called one type of learning function for determining a gas appliance being used, and there is provided a technique serving as a precondition for determining a gas appliance being used.

A characteristic value showing presence of relevance between object data and reference data is used in the present invention as a technique for determining whether or not there exists predetermined relevance between acquired object data and existing reference data. A coefficient of correlation between a measured flow value of object data and a flow value of reference data is utilized as one specific example of such a characteristic value especially in the present embodiment. FIG. 10 shows correlation coefficients R(1) to R(5) computed by the object data classification unit 409. A correlation coefficient R(i) is expressed by Equation (1) provided below. Reference symbol Q(i) designates a flow value of reference data achieved at each measurement time; $Q_A$ designates an average flow value of the reference data; q(i) designates a measured flow value of second object data achieved at each measurement time; and $q_A$ designates an average flow value of the second object data.

Mathematical Expression 1

Reference symbols $Q_A$, $q_A$ are determined from an average of all values acquired before a measurement time during which an attempt is made to acquire a correlation coefficient ($Q_A = \Sigma Q(i)/i$, $q_A = \Sigma q(i)/i$). For instance, $Q_A$ achieved at a measurement time t(2) is determined from (Q(0)+Q(1)+Q(2))/3. Likewise, $q_A$ is determined from (q(0)+q(1)+q(2))/3. A correlation coefficient R(2) to be achieved at a measurement time t(2) is determined by substituting Q(2) and q(2) into Equation (1). Similar computation is performed even at another measurement time, whereby a correlation coefficient is determined.

In the present embodiment, the object data classification unit 409 selects an arbitrary one from the plurality of thus-acquired correlation coefficients R(1) to R(5) and determines relevance between the object data and the reference data from the value of the thus-selected correlation coefficient; namely, whether or not the obtained object data are to be classified into a reference data group in which the thus-acquired object data serve as an object of comparison. In FIG. 10(*a*), the object data are data existing in a hatched area (R(5) in the present embodiment). A method for selecting a group serving as an object to be compared with the object data from a plurality of reference data groups is arbitrary.

Figure 12:
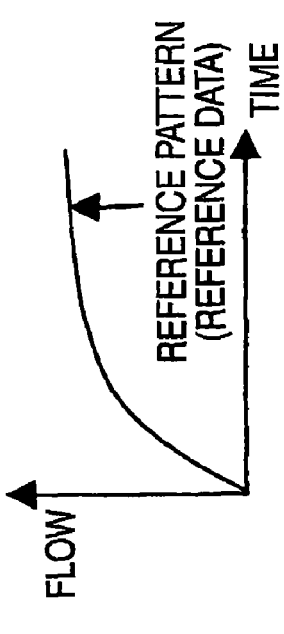
FIG. 12 A conceptual rendering showing an idea for classifying the object data into two reference data groups in a third embodiment.

FIG. 12 is a conceptual rendering showing classification of object data into any of two groups that can be said to be the roughest classifications among the classifications. The two (reference data) groups (A), (B) are differentiated and classified depending on whether the leading edge of the flow value is gentle or not gentle. When an arbitrarily-selected one correlation coefficient R(i) of the object data is a predetermined threshold value P (e.g., 0.9 and the like) or more, the object data are classified into a group (A). When the correlation coefficient R(i) is smaller than the threshold value P, the object data are classified into a group (B).

For instance, it is assumed that an arbitrarily-selected one correlation coefficient is R(5) and that the threshold value P is 0.9. When R(5) of the object data is 0.94, the object data are classified into the group (A). When R(5) of the object data is 0.88, the object data are classified into the group (B).

FIG. 13 is a conceptual rendering showing classification of object data into any of three groups that can be said to be classifications more detailed as compared with the classifications shown in FIG. 12. The three (reference data) groups (A), (B), and (C) are differentiated and classified according to whether a leading edge of a flow value is gentle, steep, or otherwise. When an arbitrarily-selected one correlation coefficient R(i) relating to the reference data 1 of the group (A) of the object data is the predetermined threshold value P (e.g., 0.9 and the like) or more, the object data are classified into the group (A). When an arbitrarily-selected one correlation coefficient R(i) relating to the reference data 2 of the group (B) of the object data is the predetermined threshold value P or more, the object data are classified into the group (B). When an arbitrarily-selected one correlation coefficient R(i) relating to the reference data of the group (A) of the object data is smaller than the threshold value P and when an arbitrarily-selected one correlation coefficient R(i) relating to the reference data of the group (B) of the object data is smaller than the threshold value P, the object data are classified into the group (C).

It may also be possible to make a change to the number, type, and threshold value P of the reference data by means of the meter installation service operator, and the like, inputting a setting by way of the input unit 418.

As mentioned above, in the present embodiment, a gas appliance, which is currently being used, can be classified into a group into which appliances exhibiting the same flow property are to be classified, by use of only one correlation coefficient, whereby grouping of gas appliances being used is readily fulfilled. The user can utilize the invention to various applied forms (determination of a gas appliance and the like) by use of such a grouping function.

In a certain case, measurement data are temporarily brought back to a management company and subjected to data processing by using data pertaining to a plurality of types of gas appliances as a reference value, whereby determination of an appliance with higher accuracy becomes feasible. Alternatively, data are collectively managed by a processing terminal in the management company by use of a communication device, whereby an improvement in accuracy is realized.

In the present embodiment, a correlation coefficient is used as a characteristic value exhibiting relevance between a measured flow value and a flow value of reference data; however, the present invention is not limited to the correlation coefficient. For instance, a mahalanobis distance that is one determination analysis technique, may also be applied, to thus classify a gas appliance, which is currently being used, to groups into which appliances of the same flow properties are to be classified, whereby determination of an appliance with higher accuracy becomes feasible.

Even in the respective embodiments to be described later, the mahalanobis distance can also be applied in the same fashion.

Fourth Embodiment

FIG. 14 is a conceptual rendering showing classification of object data of a fourth embodiment of the present invention. In the fourth embodiment, gas appliances are classified by use of only a single correlation coefficient. In the meantime, in the present embodiment, object data are grouped in consideration of a flow value of reference data in addition to a single correlation coefficient as a characteristic value serving as a reference for grouping. Specifically, in FIG. 10(b), the object data are data in a hatched area (Q(5) and R(5) in the present embodiment).

The present embodiment is identical with that shown in FIG. 13 in that the object data classification unit 409 classifies obtained object data into any of three reference data groups (A), (B), and (C) by use of the correlation coefficient R. Moreover, in the present embodiment, the object data classification unit previously classifies each of the reference data groups (A) and (B) into any of three sub-groups (D), (E), and (F) and three sub-groups (G), (H), and (I) in accordance with the flow value. A value achieved when a flow becomes constant (a flat area in the graph) is generally adopted as a way to determine a flow value of reference data.

On the basis of the measured flow value of object data achieved at a predetermined measurement time (generally after a flow has become constant), the object data classification unit 409 classifies the object data into any of the three sub-groups (D), (E), and (F) of the reference data 1 or any of the three sub-groups (G), (H), and (I) of the reference data 402. Moreover, the object data classification unit 409 classifies another object data other than those classified into the groups (D) to (I) into the group (C).

The sub-groups (D), (E), and (F) and the sub-groups (G), (H), and (I) are classified while the flow values Q1 to Q2, Q2 to Q3, and Q3 to Q4 are taken as threshold values. However, a flow value that is to serve as a threshold value may also be changed between the sub-groups (D), (E), and (F) and the sub-groups (G), (H), and (I).

According to the fourth embodiment, the object data classification unit 409 uses, as a characteristic value for grouping, a flow value of reference data as well as a correlation coefficient. Hence, as compared with the third embodiment, more accurate, detailed grouping can be performed.

When a gas appliance of the reference data group can be determined to be a specific gas appliance (of a type or with a product number), the appliance determination means 411 determines the gas appliance. However, in the present embodiment, in order to perform more detailed grouping, it may be the case where grouping operation itself performed by the reference data group storage unit will be equivalent to appliance determination operation performed by the appliance determination means 411.

Other Embodiment

In the above embodiments, grouping is performed by use of only a single correlation coefficient or a single flow value. However, a correlation coefficient and a flow value each are acquired in numbers at different times; namely, in numbers in a chronological order. Hence, grouping can also be performed by use of a plurality of correlation coefficients and/or flow values.

As indicated by the hatch of FIG. 10(c), grouping can be performed in consideration of; for instance, a relationship between R(1) to R(5), which are a plurality of correlation coefficients (all of the correlation efficient in the embodiment), and the threshold value P. In the case of; for instance, R(1)=1.00, R(2)=0.99, R(3)=0.98, R(4)=0.97, and R(5)= 0.95, the smallest value R(5) is compared with the threshold value, and grouping can be performed by a method analogous to that described in connection with the third embodiment.

Moreover, as indicated by the hatch of FIG. 10(d), after grouping has been performed by a method, such as that shown in FIG. 10(c), a flow value can be grouped in a more detailed manner as in the fourth embodiment. An embodiment shown in FIG. 10(e) is a combination of the embodiment shown in FIG. 10(c) and the embodiment shown in FIG. 10(d) (use of a plurality of correlation coefficients and a plurality of flow values).

Figure 15:
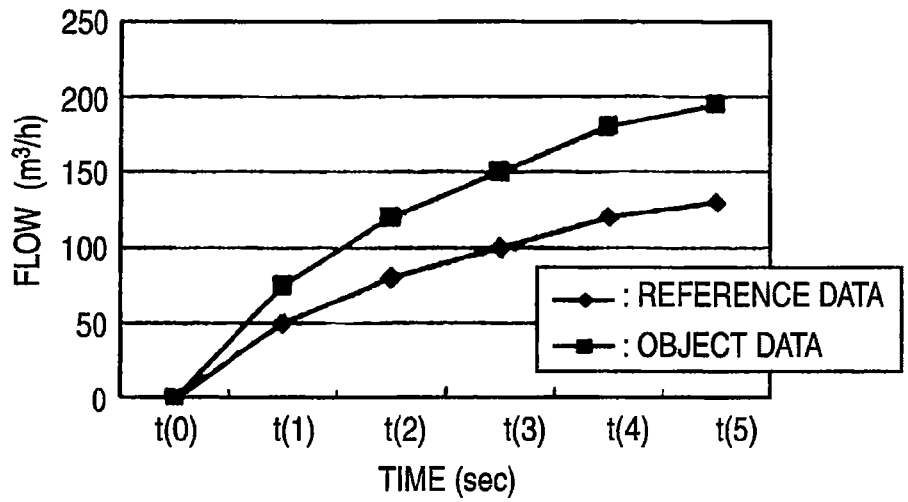
FIG. 15 A graph showing a relationship between reference data and object data.
Figure 16:
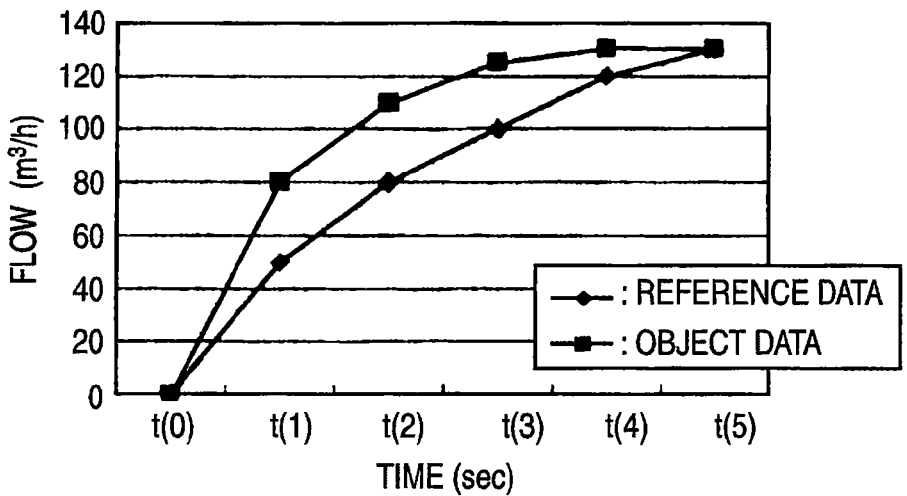
FIG. 16 A graph showing a relationship between reference data and object data.
Figure 17:
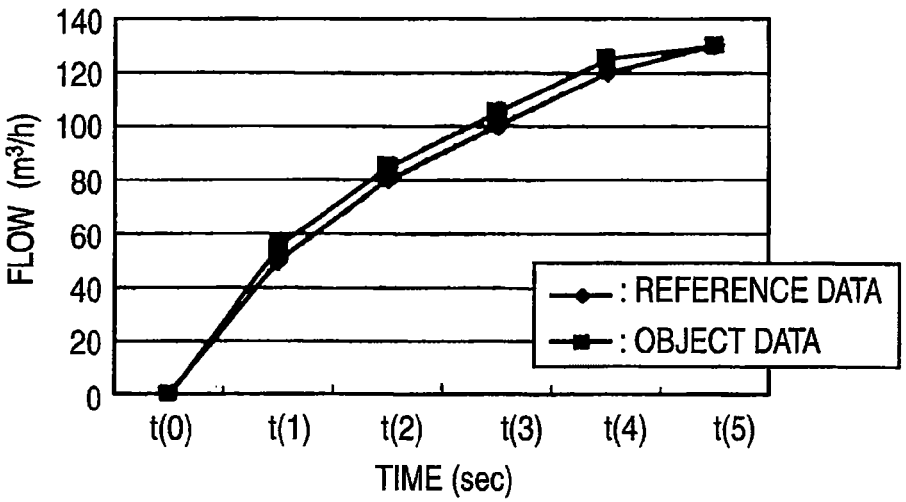
FIG. 17 A graph showing a relationship between reference data and object data.
Figure 18:
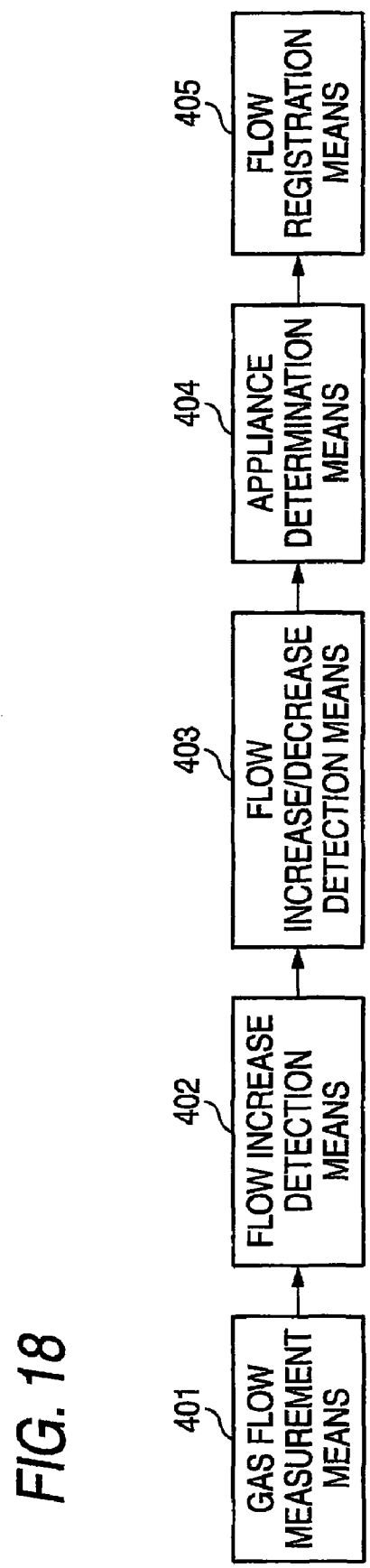
FIG. 18 A block diagram of a related-art flow measurement apparatus.
Figure 19:
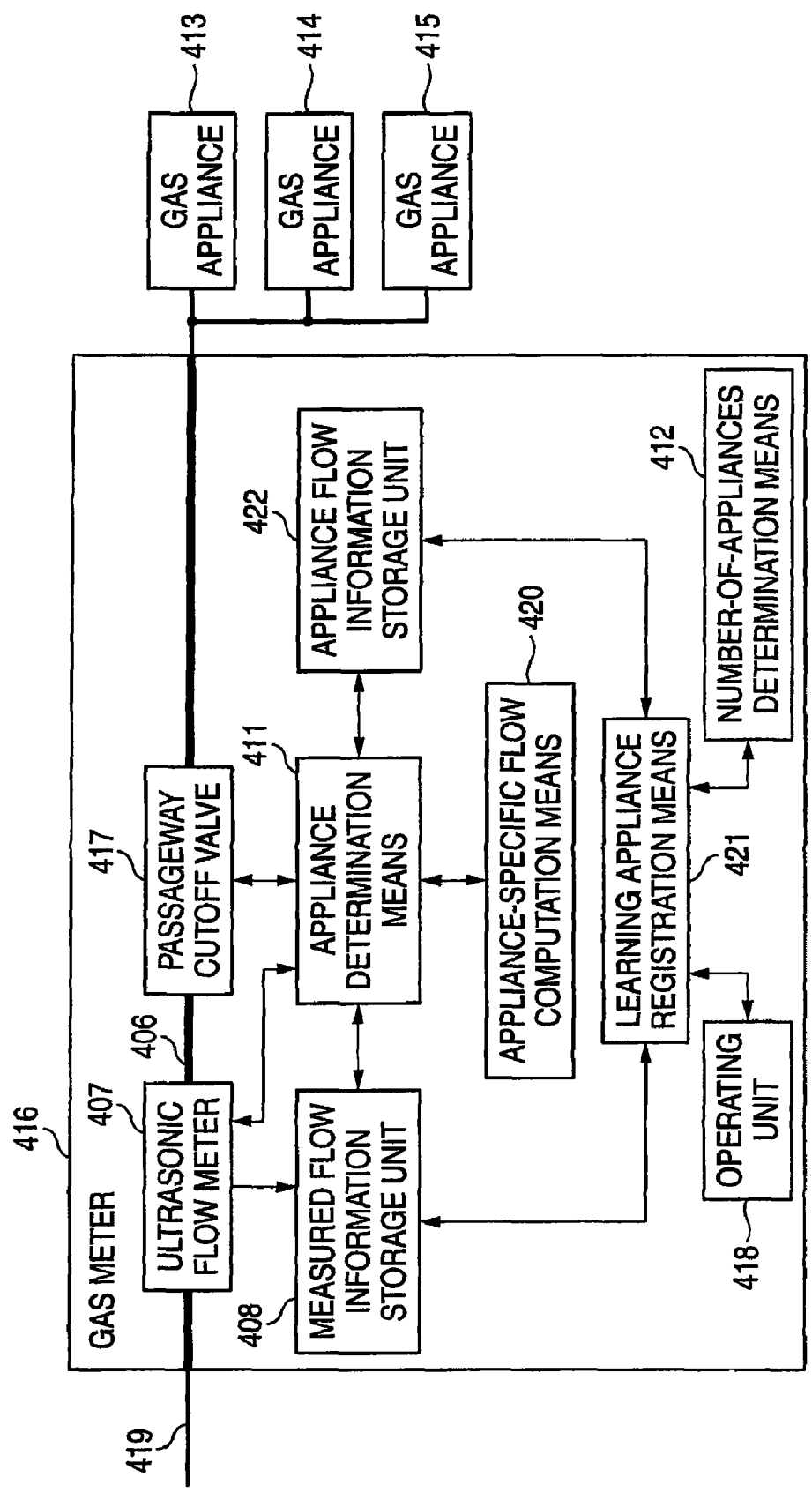
FIG. 19 A block diagram of another related-art flow measurement.

FIGS. 15 through 17 show object data classified into predetermined reference data group by use of the flow measurement apparatus and the flow measurement method of the present invention. FIG. 15 shows a relationship between object data classified by the method (the third embodiment) shown in FIG. 10(a) and the reference data. FIG. 16 shows a relationship between object data classified by the method (the fourth embodiment) shown in FIG. 10(b) and the reference data. FIG. 17 shows a relationship between object data classified by the method shown in FIG. 10(e) and the reference data. As mentioned above, it is understood that more accurate classification (in which the reference data matches object data) becomes possible as the number of parameters used for classification is increased. In FIG. 15, an essentially-similitude relation exists between two graphs of data. When a proportional relationship exists between them, a high correlation is analyzed to stand. In FIG. 16, a relationship between two graphs of data is closer to each other when compared with that shown in FIG. 15. In the case of a relationship shown in FIG. 17, the graphs are substantially congruent; namely, they are substantially coincident with each other.

The above descriptions are provided to the case of use of the ultrasonic flow meter. However, it is manifest that use of another instantaneous-type flow measurement apparatus yields similar effects. Although descriptions about processing performed after grouping are omitted, it is also evident that the gas meter can set an appliance-specific bill, which is determined by measurement of an integrated flow, for each of registered appliances or each of classified groups or an appliance-specific security function of security management (security function) processing for each of registered appliances or each of classified groups. It is manifest that accuracy of appliance determination can be further enhanced, so long as the gas meter and the gas appliance are equipped with transceiving means, such as a radio. Further, descriptions are provided by reference to a gas meter and a gas appliance. However, an industrial flow meter or a water meter can also be used, in the same fashion, for grouping appliances to be used which are connected to positions downstream of the flow measurement apparatus.

The present patent application is based on Japanese Application No. 2007-007760 filed on Jan. 17, 2007 in Japan, Japanese Application No. 2007-036749 filed on Feb. 16, 2007 in Japan, and Japanese Application No. 2007-059869 filed on Mar. 9, 2007 in Japan, contents of all of which are incorporated herein for reference.

Although the embodiments of the present invention have been described, the present invention is not limited to the matters provided in the respective embodiments. The present invention is expected to be subjected to alterations or applications conceived by those skilled in the art, on the basis of the descriptions of this patent specification and well-known techniques, and all of the alterations and applications shall fall within a range for which protection is sought.

INDUSTRIAL APPLICABILITY

As mentioned above, according to the present invention, an appliance which uses a fluid can be classified from the viewpoint of a flow property, and a technique that serves as foundations for an applied technique, such as appliance determination, are easily provided.

The invention claimed is:

1. A flow measurement apparatus comprising:
a flow measurement unit that measures an amount of fluid flowing through a passageway;
a determination zone setting unit that, using a first condition, classifies flow information measured by the flow measurement unit and set the classified flow information as into determination zones;
a determination zone storage unit that stores zone information regarding the respective determination zones;
a determination zone decision unit that, on the basis of the zone information stored in the determination zone storage unit, sorts a flow value measured by the flow measurement unit or the number of occurrences of the flow value into a determination zone;
a grouping unit that, using a second condition, groups entries in the determination zones which are stored in the determination zone storage unit, and registers the determination zones; and
an integration unit that integrates the flow value or the number of occurrences of the flow value.

2. The flow measurement apparatus according to claim 1, wherein the integration unit integrates, for each determination zone, the flow value or the number of occurrences of the flow value.

3. The flow measurement apparatus according to claim 1, wherein the grouping unit groups the flow value or the number of occurrences of the flow value integrated by the integration unit.

4. The flow measurement apparatus according to claim 1, wherein the conditions are a combination of a plurality of conditions.

5. The flow measurement apparatus according to claim 1, wherein the determination zone storage unit stores the zone information which was classified under the second condition by the determination zone setting unit for a previously-set predetermined learning period.

6. The flow measurement apparatus according to claim 5, wherein the grouping unit registers the determination zones, using the second condition, on the basis of entries which were stored in the determination zone storage unit for the learning period, and registers a corresponding appliance for each registered determination zone.

7. The flow measurement apparatus according to claim 6, wherein after the learning period, the integration unit integrates, for each registered determination zone a flow value or the number of occurrences of the flow value measured by the flow measurement unit, and performs separate processing regarding use of an appliance which is not registered or occurrence of a leakage, when integration of a flow value is performed in connection with a determination zone which is not registered.

8. An appliance determination system comprising the flow measurement apparatus defined in claim 7, the system further comprising an appliance determination unit that inputs an output from the grouping unit or the integration unit into a database in which reference data is stored, and determines an appliance which uses the fluid, use of an appliance which is not registered or occurrence of a leakage.

9. The appliance determination system according to claim 8, wherein the database is a rewritable database that is attached to the flow measurement apparatus.

10. The appliance determination system according to claim 8, wherein the database is connected to the flow measurement apparatus via a communication line.

11. The appliance determination system according to claim 8, wherein the database is connectable to a collection terminal connected to the flow measurement apparatus.

12. The appliance determination system according to claim 8, wherein
the database stores, as reference data, previously-measured waveform data pertaining to individual appliances; and
the appliance determination unit compares the reference data with an output from the integration unit or the grouping unit, thereby determining which appliance is using the fluid.

13. The appliance determination system according to claim 8, wherein
the database is configured to store operation conditions of individual households; and
the appliance determination unit compares determination criteria of an individual household with an output from the integration unit on the basis of the reference data and the operation condition, thereby determining which appliance is using the fluid.

14. A flow measurement apparatus comprising:
a flow measurement unit that measures an instantaneous amount of fluid flowing through a passageway;
a determination zone setting unit that has a first determination zone classification condition for classifying and setting a flow waveform observed during activation of an appliance, a second determination zone classification condition for classifying and setting a flow value observed during activation of an appliance, and a third determination zone classification condition for classifying and setting a time interval of operation of an appliance and that creates determination zones in a matrix pattern which combines the determination zone classification conditions;
a determination zone storage unit that allocates the flow measured by the flow measurement unit to one of the determination zones classified by the determination zone setting unit and stores a number of occurrences of the flow in the one determination zone;
a clock unit that measures a learning period during which processing for allocating the measured flow to the determination zone storage unit is performed;
a grouping unit that registers a determination zone for use in determining an appliance, based on a number of occurrences of the flow allocated to the determination zone stored in the determination zone storage unit during the learning period measured by the clock unit and that performs grouping by associating an appliance with each registered determination zone;

a determination zone decision unit that determines, after grouping, whether or not the flow measured by the flow measurement unit conforms to any registered determination zone;

an integration unit that integrates a flow value for a registered determination zone when the determination zone decision unit determines that the flow conforms to the registered determination zone; and a determination zone update unit that performs registration determination zone update processing when the determination zone decision unit determines that the flow does not conform to any registered determination zone.

15. The flow measurement apparatus according to claim 14, wherein the determination zone setting unit has a learning unit that performs measurement for a predetermined period, using registered flow value classifications classified under the second determination zone classification condition and that changes the flow value classifications classified under the second determination zone classification condition to optimum flow value classification after the measurement performed for the predetermined period.

16. The flow measurement apparatus according to claim 15, wherein the determination zone setting unit has a learning unit that performs measurement for a predetermined period, using registered time classifications classified under the third determination zone classification condition and that changes the registered time classifications classified under the third determination zone classification condition to optimum time classification after the measurement performed for the predetermined period.

17. The flow measurement apparatus according to claim 15, wherein the determination zone setting unit has a learning unit that automatically changes flow value classifications and time classifications to optimum classifications when an operation record storage pattern based on initially-created determination zones cannot be grouped in correspondence with a number of registered appliances.

18. A flow measurement apparatus comprising:
a flow measurement unit that measures an amount of fluid flowing through a passageway;
a flow information storage unit for storing object data that describe, in an associating manner, a flow value measured by the flow measurement unit and a measurement time during which the flow value is measured; and
an object data classification unit that takes first object data stored in the flow information storage unit as reference data and that classifies second object data into respective reference data groups on the basis of a characteristic value showing relevance between a measured flow value of the second object data and a flow value of the reference data.

19. The flow measurement apparatus according to claim 18, wherein the object data classification unit uses, as the characteristic value, a coefficient of correlation between the measured flow value of the second object data and a flow value of the reference data.

20. The flow measurement apparatus according to claim 19, wherein the object data classification unit uses, as the characteristic value, the correlation coefficient and a flow value of the reference data.

21. A flow measurement apparatus comprising:
a flow measurement unit that measures an amount of fluid flowing through a passageway;
a flow information storage unit for storing object data that describe, in an associating manner, a flow value measured by the flow measurement unit and a measurement time during which the flow value is measured; and
an object data classification unit that takes first object data stored in the flow information storage unit as reference data and that classifies second object data into respective reference data groups on the basis of a plurality of characteristic values showing relevance between a plurality of measured flow values of the second object data and a plurality of flow values of the reference data corresponding to times during which the plurality of flow values are measured.

22. The flow measurement apparatus according to claim 21, wherein the object data classification unit uses, as the characteristic value, a coefficient of correlation between the measured flow value of the second object data and a flow value of the reference data.

23. The flow measurement apparatus according to claim 22, wherein the object data classification unit uses, as the characteristic value, the correlation coefficient and a flow value of the reference data.

24. A flow measurement method comprising computer executable steps executed by a flow measurement apparatus to implement:
a step of measuring an amount of fluid flowing through a passageway;
a step of storing object data that describe, in an associating manner, a flow value measured and a measurement time during which the flow value is measured; and
a step of taking first object data stored as reference data and classifying second object data into respective reference data groups on the basis of a characteristic value showing relevance between a measured flow value of the second object data and a flow value of the reference data.

25. A flow measurement method comprising computer executable steps executed by a flow measurement apparatus to implement:
a step of measuring an amount of fluid flowing through a passageway;
a step of storing object data that describe, in an associating manner, a flow value measured and a measurement time during which the flow value is measured; and
a step of taking first object data stored as reference data and classifying second object data into respective reference data groups on the basis of a plurality of characteristic values showing relevance between a plurality of measured flow values of the second object data and a plurality of flow values of the reference data.

26. A non-transitory storage medium storing programs for causing a flow measurement apparatus to perform processing pertaining to
a step of measuring an amount of fluid flowing through a passageway;
a step of storing object data that describe, in an associating manner, a flow value measured and a measurement time during which the flow value is measured; and
a step of taking first object data stored as reference data and classifying second object data into respective reference data groups on the basis of a plurality of characteristic values showing relevance between a plurality of measured flow values of the second object data and a plurality of flow values of the reference data.

27. A non-transitory storage medium storing programs for causing a flow measurement apparatus to perform processing pertaining to
a step of measuring an amount of fluid flowing through a passageway;
a step of storing object data that describe, in an associating manner, a flow value measured and a measurement time during which the flow value is measured; and a step of taking first object data stored as reference data and classifying second object data into respective reference data groups on the basis of a characteristic value showing relevance between a measured flow value of the second object data and a flow value of the reference data.

28. A flow measurement apparatus comprising:
a flow measurement unit that measures flow rates of fluid flowing through a passage to which at least one appliance is connected;
a determination zone setting unit that defines a set of attributes identifiable in a profile of flow rates and a set of parameters representative of each attribute and indicative, respectively, of different classes of each attribute;
a determination zone storage unit that presents memory areas each defined by a different combination of single parameters selected, respectively, from the parameter sets;
a determination zone decision unit that analyzes a profile of flow rates measured by the flow measurement unit and makes an entry in a memory area of the determination zone storage if the profile of the measured flow rates is accountable by a combination of parameters which defines the memory area; and
a grouping unit that divides the memory areas into groups according to distributions of the entries over the memory areas.

29. The flow measurement apparatus according to claim 28, wherein making an entry in a memory area comprises incrementing a number stored in the memory area, and the number stored in the memory area indicates a number of times flow rates are observed which form profiles accountable by a particular combination of parameters which defines the memory area.

30. The flow measurement apparatus according to claim 28, wherein making an entry in a memory area comprises adding an amount of fluid calculated to have flown to a number stored in the memory area, and the number stored in the memory area indicates a total amount of fluid having flown with profiles of flow rates accountable by a particular combination of parameters which defines the memory area.

31. The flow measurement apparatus according to claim 28, wherein the attributes comprise a shape of a profile exhibited upon activation of an appliance, an amount of fluid flowing during activation of an appliance and a time interval an appliance is operated.

32. The flow measurement apparatus according to claim 28, wherein the grouping unit divides the memory areas into groups based on entries made for a learning period.

33. The flow measurement apparatus according to claim 28, further comprising an appliance determination unit that correlates an appliance with a group of memory areas when a profile of flow rates exhibited by the appliance is accountable by combinations of parameters defining the group of memory areas.

34. The flow measurement apparatus according to claim 28, further comprising a determination zone updating unit that resets the memory areas and makes new entries in the memory areas if the determination zone decision unit finds a profile of measured flow rates which does not belong to any of the groups of the memory areas, wherein the grouping unit divides the memory areas into new groups according to distributions of the new entries over the memory areas.

35. The flow measurement apparatus according to claim 34, further comprising an appliance determination unit that determines there is a fluid leak if the determination zone decision unit finds a profile of measured flow rates which does not belong to any of the new groups of the memory areas.

36. The flow measurement apparatus according to claim 28, further comprising a learning unit which redefines some of the parameters if the entries are discriminately distributed over the memory areas.

37. An appliance determination system comprising:
the flow measurement apparatus defined in claim 28;
a database that stores exemplary profiles of flow rates exhibited by appliances; and
a determination unit that compares the exemplary profiles stored in the database with combinations of parameters defining the groups of memory areas and correlates the groups of memory areas, respectively, with the appliances.

38. The appliance determination system according to claim 37, wherein the database is connected directly to the flow measurement apparatus.

39. The appliance determination system according to claim 37, wherein the database is connected to the flow measurement apparatus via a communication line.

40. The appliance determination system according to claim 37, wherein the database further stores appliance operation information of individual households, and the determination unit uses the appliance operation information when correlating the groups of memory areas, respectively, with the appliances.

41. A flow measurement apparatus comprising:
a flow measurement unit that measures at intervals a flow rate of fluid flowing through a passageway to which at least one appliance is connected;
a flow information storage unit in which object data indicative of a profile of measured flow rates is storable in relation to measurement times during which the flow rates were measured;
a reference data group storage unit that stores reference data in sets each indicative of a different exemplary profile of flow rates, wherein the reference data sets are each correlatable with a different group of appliances; and
an object data classification unit that determines a relevance between the profile of the object data and the exemplary profile of the respective sets of reference data and stores at least part of the object data as a new set of reference data in the reference data group storage unit if none of the determined relevances satisfies a predetermined level of relevance, while if a set of reference data is found which satisfies the predetermined level of relevance, identifying the measured flow rates as being exhibited by an appliance which belongs to a group of appliances correlated with the found set of reference data.

* * * * *